US012688041B2

(12) United States Patent
Randall et al.

(10) Patent No.: US 12,688,041 B2
(45) Date of Patent: Jul. 21, 2026

(54) VECTORIZED OPERATIONS FOR SPARSE KERNELS

(71) Applicant: Arm Limited, Cambridge (GB)

(72) Inventors: Joshua Randall, Austin, TX (US);
Jesse Garrett Beu, Austin, TX (US);
Krishnendra Nathella, Austin, TX
(US); Tuan Quang Ta, Ithaca, NY (US)

(73) Assignee: Arm Limited, Cambridge (GB)

( * ) Notice: Subject to any disclaimer, the term of this
patent is extended or adjusted under 35
U.S.C. 154(b) by 1105 days.

(21) Appl. No.: 17/743,705

(22) Filed: May 13, 2022

(65) Prior Publication Data

US 2023/0367843 A1 Nov. 16, 2023

(51) Int. Cl.
*G06F 9/30* (2018.01)
*G06F 17/16* (2006.01)

(52) U.S. Cl.
CPC ........ *G06F 9/30043* (2013.01); *G06F 9/3001*
(2013.01); *G06F 9/30021* (2013.01); *G06F
9/30032* (2013.01); *G06F 9/30036* (2013.01);
*G06F 17/16* (2013.01)

(58) Field of Classification Search
CPC .. G06F 17/16; G06F 9/30021; G06F 9/30032;
G06F 9/30036; G06F 9/30043; G06F
9/3001
See application file for complete search history.

(56) References Cited

U.S. PATENT DOCUMENTS

| | | | |
|---|---|---|---|
| 2013/0283018 A1* | 10/2013 | Ould-Ahmed-Vall | ...................... G06F 9/30038 712/225 |
| 2018/0046900 A1* | 2/2018 | Dally | ..................... G06N 3/048 |
| 2020/0104126 A1* | 4/2020 | Pearce | .................. G06F 12/084 |

OTHER PUBLICATIONS

Zhang, Z. "SpArch: Efficient Architecture for Sparse Matrix Multiplication" (https://www.cse.wustl.edu/~roger/566S.s24/SpArch_2020.pdf) (Year: 2020).*
Tanenbaum, A. S. "Structured Computer Organization" Third Edition (Year: 1990).*

* cited by examiner

*Primary Examiner* — Andrew Caldwell
*Assistant Examiner* — Carlos Heberto De La Garza
(74) *Attorney, Agent, or Firm* — Leveque Intellectual
Property Law, P.C.

(57) ABSTRACT

A data processing method and processor instructions are provided that leverage scatter operations to efficiently merge vector and matrix indices, as compared to standard matrix and vector operations, as well as merge other arithmetic results, lists of numbers, etc.

17 Claims, 22 Drawing Sheets

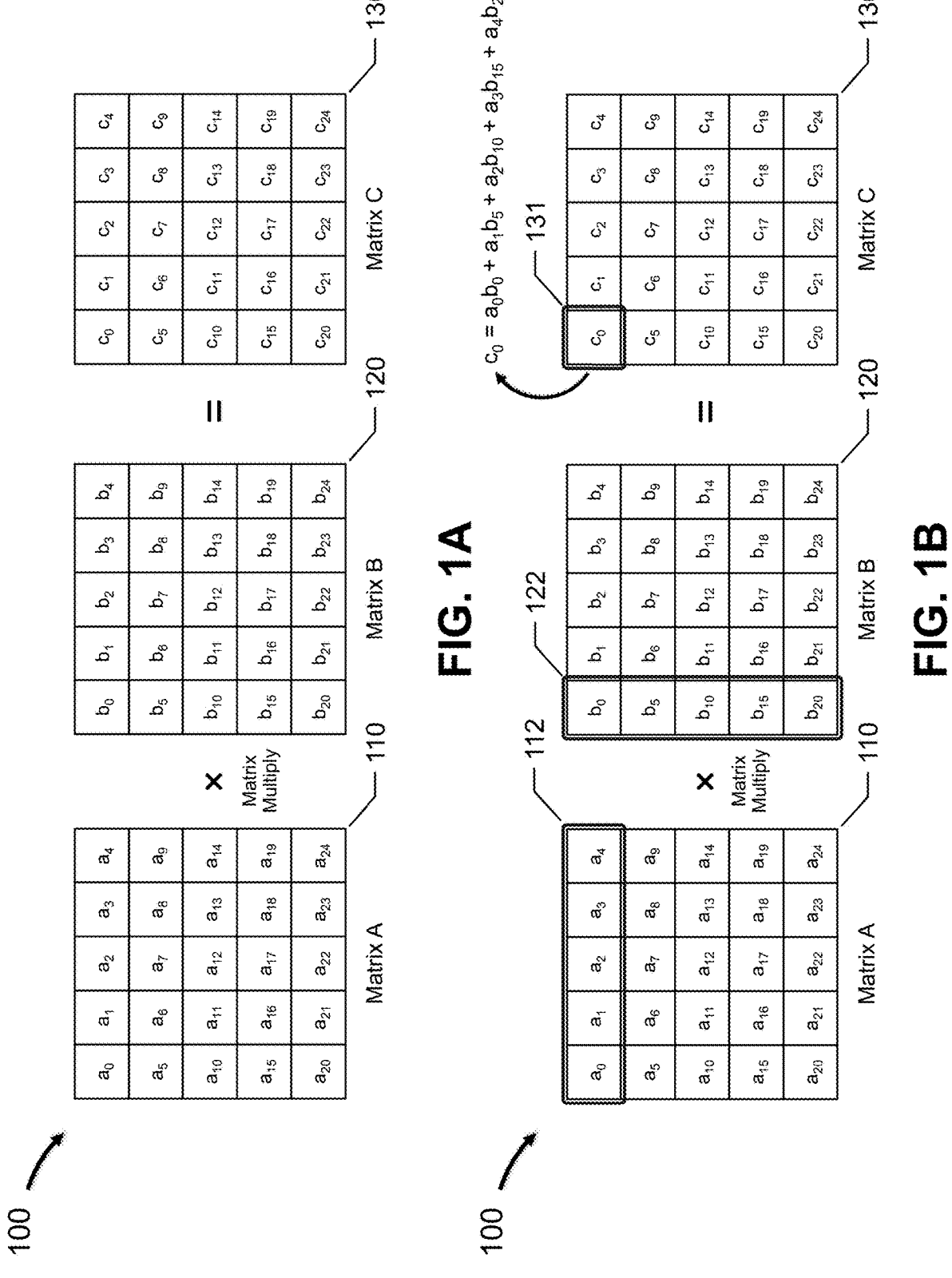

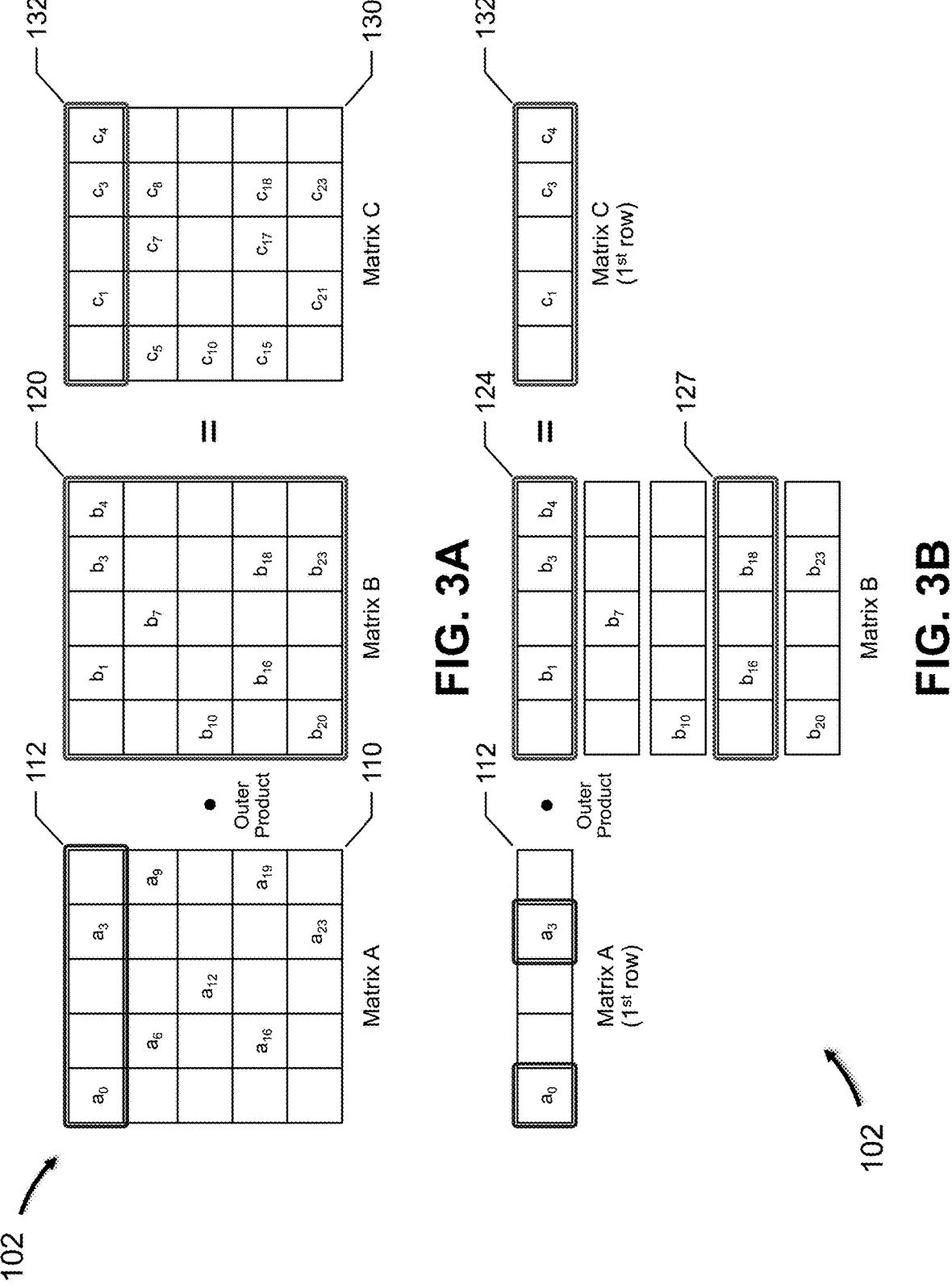

$c_0 = a_0b_0 + a_1b_1 + a_2b_2 + a_3b_3 + a_4b_4$
$c_1 = b_0a_5 + b_1a_6 + b_2a_7 + b_3a_8 + b_4a_9$
$c_2 = b_0a_{10} + b_1a_{11} + b_2a_{12} + b_3a_{13} + b_4a_{14}$
$c_3 = b_0a_{15} + b_1a_{16} + b_2a_{17} + b_3a_{18} + b_4a_{19}$
$c_4 = b_0a_{20} + b_1a_{21} + b_2a_{22} + b_3a_{23} + b_4a_{24}$

VECTORIZED OPERATIONS FOR SPARSE KERNELS

BACKGROUND

The present disclosure relates to computer systems. More particularly, the present disclosure relates to data processing.

Graph algorithms are common in many complex problem domains, and are often implemented as linear algebra problems with extreme sparsity. Machine learning (ML) applications, generally, and artificial neural networks (ANNs), such as deep neural networks (DNNs), convolutional neural networks (CNNs), etc., specifically, are popular solutions to a wide array of challenging classification, recognition and regression problems. Similarly, ML applications and ANNs are often implemented, at least in part, as linear algebra problems with extreme sparsity in the weights, and, oftentimes during execution, extreme sparsity in the data as well.

BRIEF DESCRIPTION OF THE DRAWINGS

FIGS. 1A and 1B depict a standard matrix multiplication, according to an embodiment of the present disclosure.

FIGS. 3A, 3B and 3C depict a matrix outer product, according to an embodiment of the present disclosure.

DETAILED DESCRIPTION

Figures 2A, 2B:
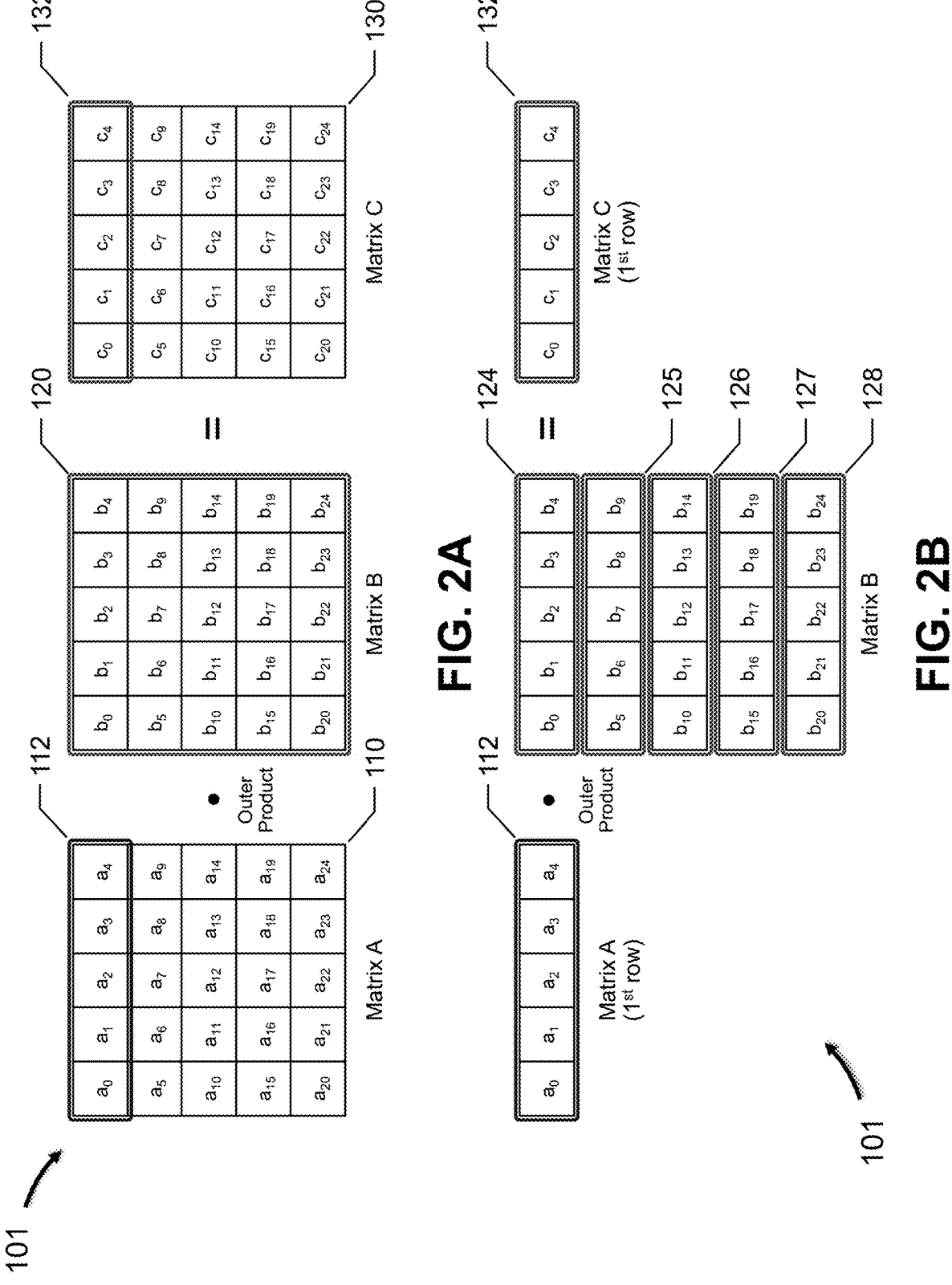
FIGS. 2A, 2B and 2C depict a matrix outer product, according to an embodiment of the present disclosure.

Embodiments of the present disclosure will now be described with reference to the drawing figures, in which like reference numerals refer to like parts throughout.

Embodiments of the present disclosure advantageously provide a data processing method and processor instructions that leverage scatter operations to efficiently merge vector and matrix indices, as compared to standard matrix and vector operations, as well as merge other arithmetic results, lists of numbers, etc. Generally, the processor includes an instruction decoder to control, inter alia, processing circuitry to generate scatter index values and perform a scatter accumulate operation on two vectors to efficiently generate a sorted merged vector. The processor may be a central processing unit (CPU), a core of a multi-core processor, a specialized processor, such as, for example, a graphics processing unit (GPU) processor, a neural processing unit (NPU) processor, an ANN accelerator processor, etc.

In one embodiment, a processor includes an instruction decoder configured to decode instructions, and processing circuitry configured to perform data processing in response to instructions decoded by the instruction decoder. In response to one or more read instructions, the instruction decoder is configured to control the processing circuitry to read first and second vectors from a storage, each vector including at least index values. In response to a sequence of instructions, the instruction decoder is configured to control the processing circuitry to generate scatter index values for the first and second vectors based on the index values of the first and second vectors. And, in response to one or more scatter instructions, the instruction decoder is configured to execute a scatter operation, using the scatter index values of the first and second vectors, to generate a sorted merged vector.

FIGS. 1A and 1B depict standard matrix multiplication 100, according to an embodiment of the present disclosure.

Matrix 110 includes 25 elements, i.e., $a_0, \ldots, a_{24}$, arranged in five rows and 5 columns (5×5). Matrix 120 also includes 25 elements, i.e., $b_0, \ldots, b_{24}$, arranged in five rows and 5 columns (5×5). To multiply matrix 110 and matrix 120, a dot product (or inner product) is calculated for each row of matrix 110 and each column of matrix 120 and stored as an element of matrix 130. Matrix 130 also includes 25 elements, i.e., $c_0, \ldots, c_{24}$, arranged in five rows and 5 columns (5×5). Standard matrix multiplication requires that the number of columns of matrix 110 (i.e., 5) equal the number of rows of matrix 120 (i.e., 5).

Generally, the dot product of a row of matrix 110 and a column of matrix 130 is calculated by multiplying each element of the row of matrix 110 with a corresponding element of the column of matrix 120 to generate an intermediate product, and then accumulating the intermediate products into the respective element of matrix 130. For example, element $c_0$ of matrix 130 is the dot product of the first row 112 of matrix 110 and the first column 122 of matrix 120, i.e., $c_0$ is equal to $a_0 \cdot b_0 + a_1 \cdot b_5 + a_2 \cdot b_{10} + a_3 \cdot b_{15} + a_4 \cdot b_{20}$. Similarly, the dot product for element $c_1$ of matrix 130 is calculated using the first row 112 of matrix 110 and the second column of matrix 120, i.e., $c_1$ is equal to $a_0 \cdot b_1 + a_1 \cdot b_6 + a_2 \cdot b_{11} + a_3 \cdot b_{16} + a_4 \cdot b_{21}$. And so on for the remaining elements $c_2, \ldots, c_{24}$ of matrix 130.

The matrix outer product may also be used to multiply matrix 110 and matrix 120 to generate matrix 130.

Figure 2C:
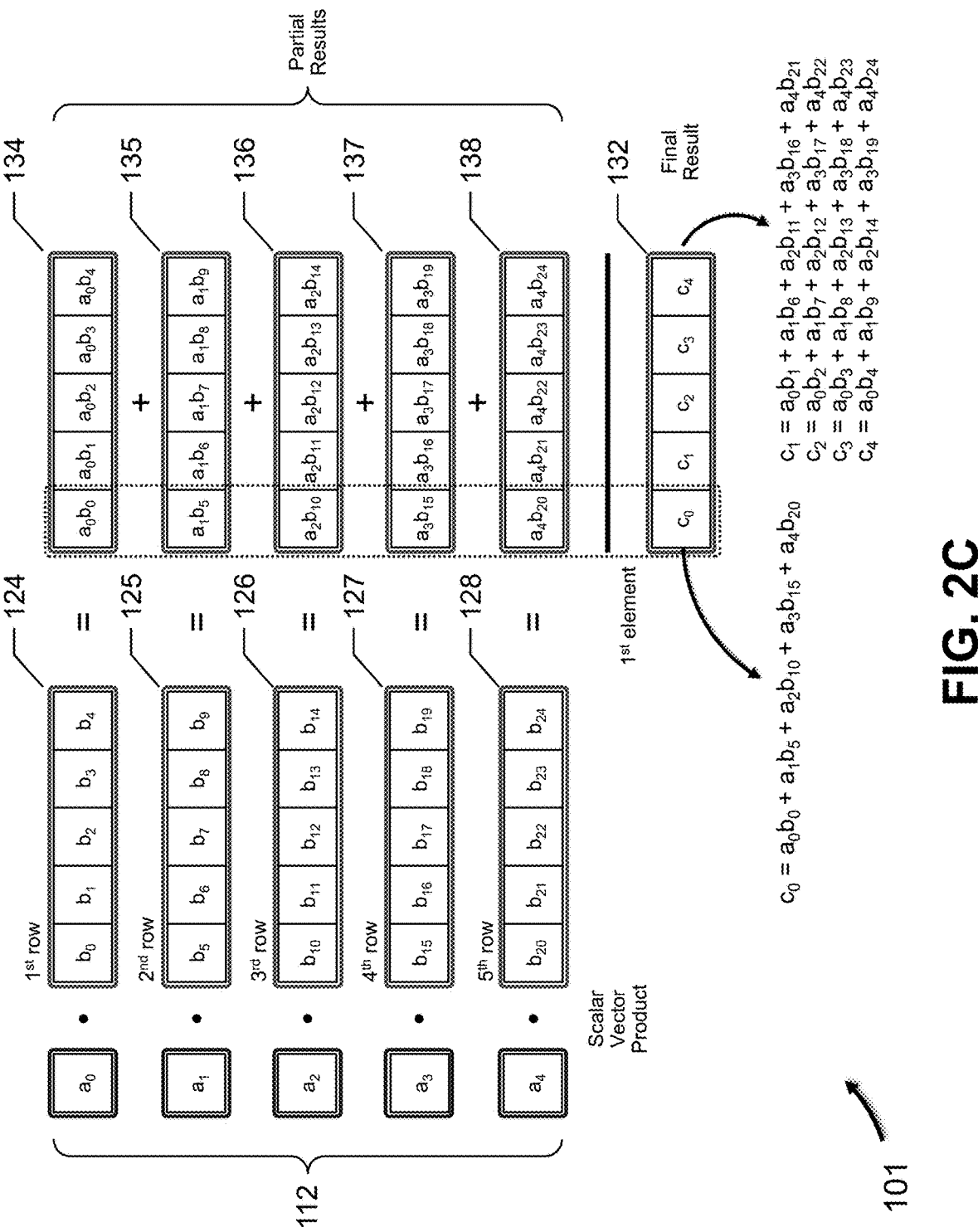

FIGS. 2A, 2B and 2C depict matrix outer product 101, according to an embodiment of the present disclosure.

The outer product of matrix 110 and matrix 120 generates matrix 130. To calculate the outer product of matrix 110 and matrix 120, an outer product is calculated for each row of matrix 110 and matrix 120, and stored as a row of matrix 130. The outer product for each row of matrix 110 and matrix 120 includes a number of scalar vector calculations, each of which produces a partial result for the elements of the respective row of matrix 130. The partial results are merged (or summed) to product the final result for the elements of the respective row of matrix 130.

For example, the outer product for the first row 112 of matrix 110 and matrix 120 generates the first row 132 of matrix 130. The first row of matrix 110 includes elements $a_0$, $a_1$, $a_2$, as, $a_4$. Matrix 120 includes five rows, i.e., first row 124 (i.e., elements $b_0$, $b_1$, $b_2$, $b_3$, $b_4$), second row 125 (i.e., elements $b_5$, $b_6$, $b_7$, $b_8$, $b_9$), third row 126 (i.e., elements $b_{10}$, $b_{11}$, $b_{12}$, $b_{13}$, $b_{14}$), fourth row 127 (i.e., elements $b_{15}$, $b_{16}$, $b_{17}$, $b_{18}$, $b_{19}$), and fifth row 128 (i.e., elements $b_{20}$, $b_{21}$, $b_{22}$, $b_{23}$, $b_{24}$). The first row 132 of matrix 130 includes elements $c_0$, $c_1$, $c_2$, $c_3$, $c_4$.

The first scalar vector calculation multiplies element $a_0$ with each of the elements of first row 124 (i.e., elements $b_0$, $b_1$, $b_2$, $b_3$, $b_4$) to generate partial result 134 for the elements of first row 132 of matrix 130 (i.e., $a_0b_0$, $a_0b_1$, $a_0b_2$, $a_0b_3$, $a_0b_4$). The second scalar vector calculation multiplies element $a_1$ with each of the elements of second row 125 (i.e., elements $b_5$, $b_6$, $b_7$, $b_8$, $b_9$) to generate partial result 135 for the elements of first row 132 of matrix 130 (i.e., $a_1b_5$, $a_1b_6$, $a_1b_7$, $a_1b_8$, $a_1b_9$). The third scalar vector calculation multiplies element $a_2$ with each of the elements of third row 126 (i.e., elements $b_{10}$, $b_{11}$, $b_{12}$, $b_{13}$, $b_{14}$) to generate partial result 136 for the elements of first row 132 of matrix 130 (i.e., elements $a_2b_{10}$, $a_2b_{11}$, $a_2b_{12}$, $a_2b_{13}$, $a_2b_{14}$). The fourth scalar vector calculation multiplies element $a_3$ with each of the elements of fourth row 127 (i.e., elements $b_{15}$, $b_{16}$, $b_{17}$, $b_{18}$, $b_{19}$) to generate partial result 137 for the elements of first row 132 of matrix 130 (i.e., elements $a_3b_{15}$, $a_3b_{16}$, $a_3b_{17}$, $a_3b_{18}$, $a_3b_{19}$). The fifth scalar vector calculation multiplies element $a_4$ with each of the elements of fifth row 128 (i.e., elements $b_{20}$, $b_{21}$, $b_{22}$, $b_{23}$, $b_{24}$) to generate partial result 138 for the elements of first row 132 of matrix 130 (i.e., elements $a_4b_{20}$, $a_4b_{21}$, $a_4b_{22}$, $a_4b_{23}$, $a_4b_{24}$).

The partial results are merged (or summed) to product the final result for the elements of the first row 132 row of matrix 130, i.e., element $c_0$ is equal to $a_0b_0+a_1b_5+a_2b_{10}+a_3b_{15}+a_4b_{20}$, element $c_1$ is equal to $a_0b_1+a_1b_6+a_2b_{11}+a_3b_{16}+a_4b_{21}$, element $c_2$ is equal to $a_0b_2+a_1b_7+a_2b_{12}+a_3b_{17}+a_4b_{22}$, element $c_3$ is equal to $a_0b_3+a_1b_8+a_2b_{13}+a_3b_{18}+a_4b_{23}$, and element $c_4$ is equal to $a_0b_4+a_1b_9+a_2b_{14}+a_3b_{19}+a_4b_{24}$.

The outer products for the remaining rows of matrix 130 are similarly calculated.

Figure 3C:
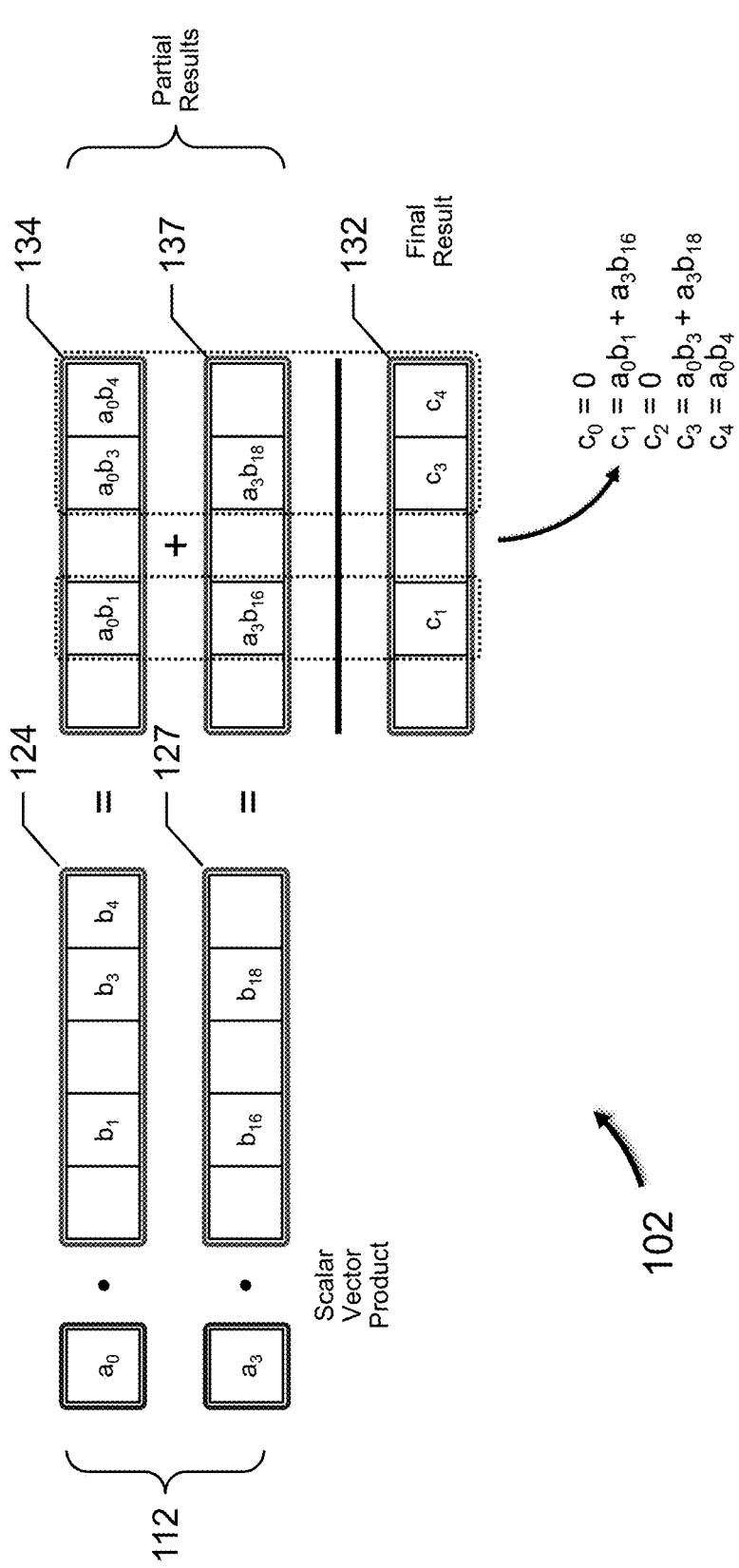

FIGS. 3A, 3B and 3C depict matrix outer product 102, according to an embodiment of the present disclosure.

In this embodiment, matrix 110 and matrix 120 are sparse matrices in which more than half of the elements in each matrix have a value of 0. The non-zero elements of matrix 110 are elements $a_0$, $a_3$, $a_6$, $a_9$, $a_{12}$, $a_{16}$, $a_1$ and $a_{23}$, while the non-zero elements of matrix 120 are $b_1$, $b_3$, $b_4$, $b_7$, $b_{10}$, $b_{16}$, $b_{18}$, $b_{20}$ and $b_{23}$. Due to the sparsity of matrices 110 and 120, the outer product for each row of matrix 110 and matrix 120 includes a reduced number of scalar vector calculations, which generate a reduced number of non-zero elements in matrix 130.

For example, as above, the outer product for the first row 112 of matrix 110 and matrix 120 generates the first row 132 of matrix 130. Because the first row of matrix 110 includes non-zero elements $a_0$ ($1^{st}$ column) and $a_3$ ($4^{th}$ column), only two scalar vector calculations are needed to determine the non-zero elements of the first row 132 of matrix 130.

The first scalar vector calculation multiplies element $a_0$ with each of the non-zero elements of first row 124 (i.e., elements $b_1$, $b_3$, $b_4$) to generate partial result 134 for the elements of first row 132 of matrix 130 (i.e., 0, $a_0b_1$, 0, $a_0b_3$, $a_0b_4$). The second scalar vector calculation multiplies element $a_3$ with each of the non-zero elements of fourth row

127 (i.e., elements $b_{16}$, $b_{18}$) to generate partial result 137 for the elements of first row 132 of matrix 130 (i.e., 0, $a_3b_{16}$, 0, $a_3b_{18}$, 0).

The partial results are merged (or summed) to product the final result for the elements of the first row 132 row of matrix 130, i.e., element $c_1$ is equal to $a_0b_1+a_3b_{16}$, element $c_3$ is equal to $a_0b_3+a_3b_{18}$, and element $c_4$ is equal to $a_0b_4$.

Figures 4A, 4B:
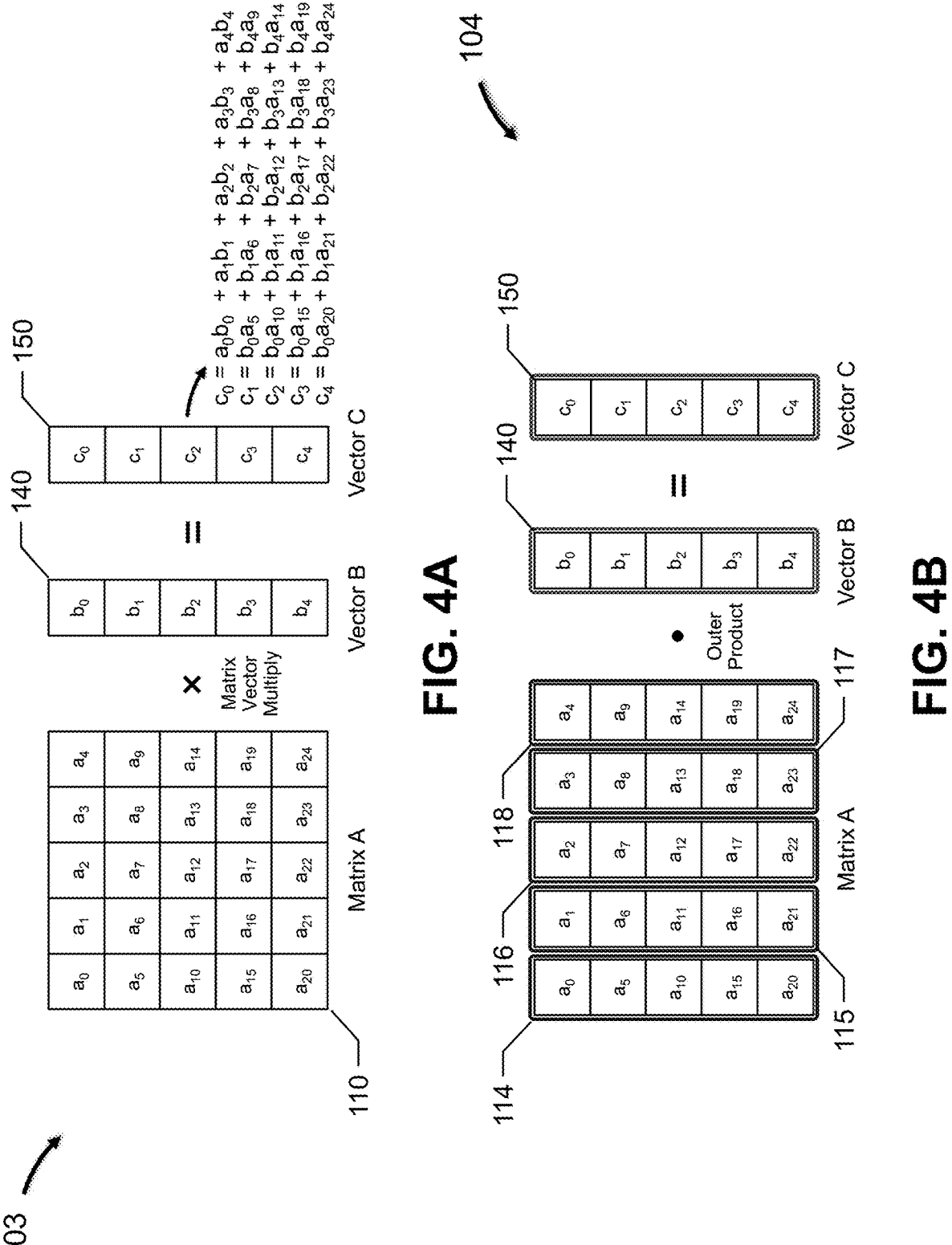
FIG. 4A depicts a standard matrix vector multiplication, according to an embodiment of the present disclosure.
FIGS. 4B and 4C depict a matrix vector outer product, according to an embodiment of the present disclosure.

FIG. 4A depicts standard matrix vector multiplication 103, according to an embodiment of the present disclosure.

Matrix 110 includes 25 elements, i.e., $a_0$, . . . , $a_{24}$, arranged in five rows and 5 columns (5×5). Vector 140 includes 5 elements, i.e., $b_0$, $b_1$, $b_2$, $b_3$, $b_4$, arranged in five rows and one column (5×1). To multiply matrix 110 and vector 140, a dot product (or inner product) is calculated for each row of matrix 110 and vector 140 and stored as an element of vector 150. Vector 150 includes 5 elements, i.e., $c_0$, $c_1$, $c_2$, $c_3$, $c_4$, arranged in five rows and one column (5×1). Standard matrix vector multiplication requires that the number of columns of matrix 110 (i.e., 5) equal the number of rows of vector 140 (i.e., 5).

Generally, the dot product of a row of matrix 110 and vector 140 is calculated by multiplying each element of the row of matrix 110 with a corresponding element of vector 140 to generate an intermediate product, and then accumulating the intermediate products into the respective element of vector 150. For example, element $c_0$ of vector 150 is the dot product of the first row 112 of matrix 110 and vector 140, i.e., $c_0$ is equal to $a_0 \cdot b_0 + a_1 \cdot b_1 + a_2 \cdot b_2 + a_3 \cdot b_3 + a_4 \cdot b_4$. Similarly, the dot product for element $c_1$ of vector 150 is calculated using the second row of matrix 110 and vector 140, i.e., element $c_1$ is equal to as $b_0 + a_6 \cdot b_1 + a_7 \cdot b_2 + a_8 \cdot b_3 + a_9 \cdot b_4$. And so on for the remaining elements $c_2$, $c_3$, $c_4$ of vector 150, i.e., element $c_2$ is equal to $b_0a_{10}+b_1a_{11}+b_2a_{12}+b_3a_{13}+b_4a_{14}$, element $c_3$ is equal to $b_0a_{15}+b_1a_{16}+b_2a_{17}+b_3a_{18}+b_4a_{19}$, and element $c_4$ is equal to $b_0a_{20}+b_1a_{21}+b_2a_{22}+b_3a_{23}+b_4a_{24}$.

The matrix outer product may also be used to multiply matrix 110 and vector 140 to generate vector 150.

Figure 4C:
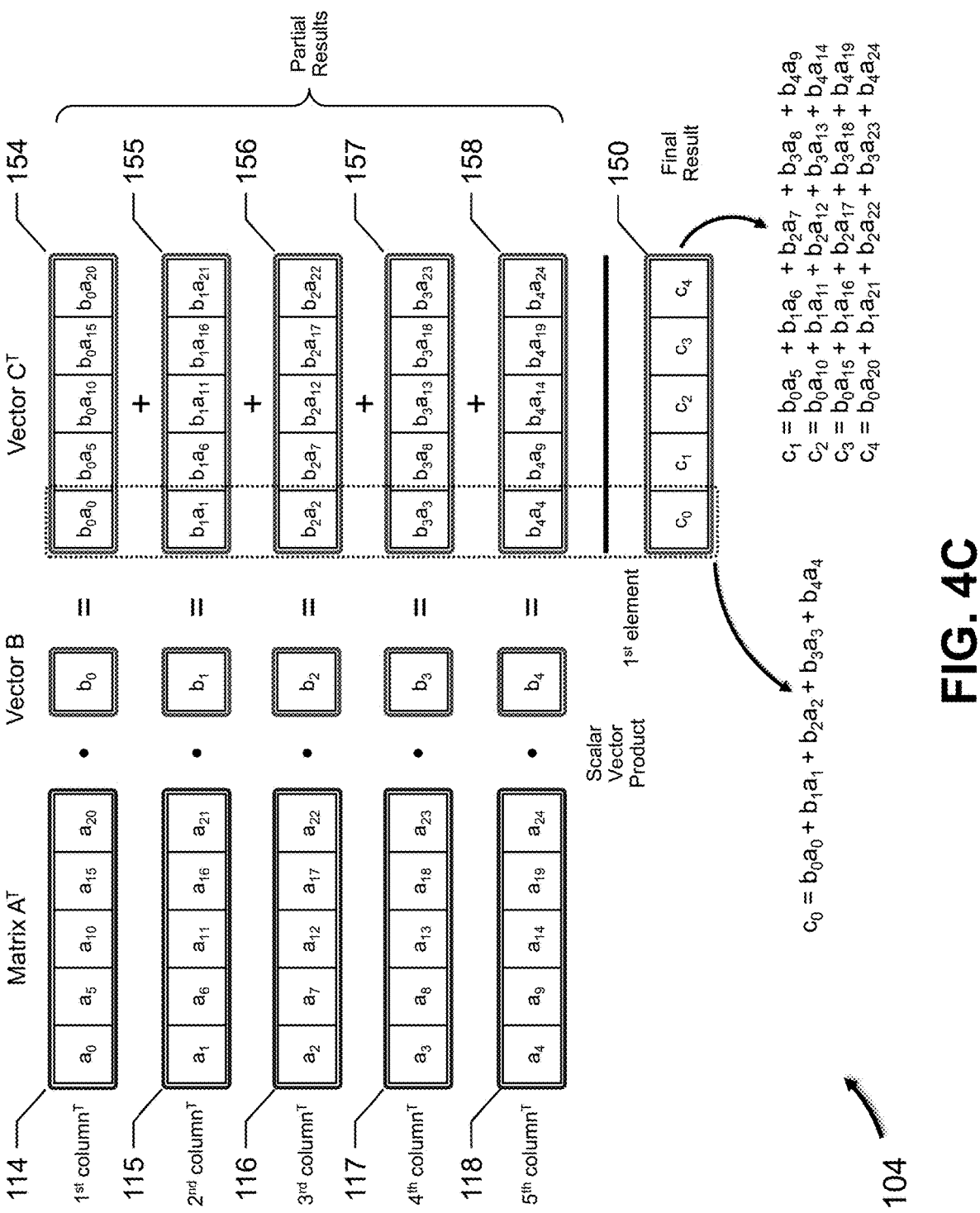

FIGS. 4B and 4C depict matrix vector outer product 104, according to an embodiment of the present disclosure.

The outer product of matrix 110 and vector 140 generates vector 150. The outer product for matrix 110 and vector 140 includes a number of scalar vector calculations, each of which generates a partial result for the elements of vector 150. The partial results are merged (or summed) to generate the final result for the elements of vector 150.

Matrix 110 includes five columns, i.e., first column 114 (i.e., elements $a_0$, $a_5$, $a_{10}$, $a_{15}$, $a_{20}$), second column 115 (i.e., elements $a_1$, $a_6$, $a_{11}$, $a_{16}$, $a_{21}$), third row 126 (i.e., elements $a_2$, $a_7$, $a_{12}$, $a_{17}$, $a_{22}$), fourth row 127 (i.e., elements $a_3$, as, $a_{13}$, $a_{18}$, $a_{23}$), and fifth row 128 (i.e., elements $a_4$, as, $a_{14}$, $a_{19}$, $a_{24}$). Vector 140 includes five rows (i.e., elements $b_0$, $b_1$, $b_2$, $b_3$, $b_4$, and vector 150 includes five rows, i.e., elements $c_0$, $c_1$, $c_2$, $c_3$, $c_4$.

The first scalar vector calculation multiplies element $b_0$ ($1^{st}$ row) with each of the elements of first column 114 (i.e., elements $a_0$, as, $a_{10}$, $a_{15}$, $a_{20}$) to generate partial result vector 154 (i.e., $b_0a_0$, $b_0a_5$, $b_0a_{10}$, $b_0a_{15}$, $b_0a_{20}$). The second scalar vector calculation multiplies element $b_1$ ($2^{nd}$ row) with each of the elements of second column 115 (i.e., elements $a_1$, $a_6$, $a_{11}$, $a_{16}$, $a_{21}$) to generate partial result vector 155 (i.e., $b_1a_1$, $b_1a_6$, $b_1a_{11}$, $b_1a_{16}$, $b_1a_{21}$). The third scalar vector calculation multiplies element $b_2$ ($3^{rd}$ row) with each of the elements of third column 116 (i.e., elements $a_2$, $a_7$, $a_{12}$, $a_{17}$, $a_{22}$) to generate partial result vector 156 (i.e., $b_2a_2$, $b_2a_7$, $b_2a_{12}$, $b_2a_{17}$, $b_2a_{22}$). The fourth scalar vector calculation multiplies element $b_3$ ($4^{th}$ row) with each of the elements of fourth column 117 (i.e., elements $a_3$, as, $a_{13}$, $a_{18}$, $a_{23}$) to generate partial result vector 157 (i.e., $b_3a_3$, $b_3a_8$, $b_3a_{13}$, $b_3a_{18}$, $b_3a_{23}$). The fifth scalar vector calculation multiplies element $b_4$ ($5^{th}$ row) with each of the elements of fifth column 118 (i.e., elements $a_4$, $a_8$, $a_{14}$, $a_{19}$, $a_{24}$) to generate partial result vector 158 (i.e., $b_4a_4$, $b_4a_9$, $b_4a_{14}$, $b_4a_{19}$, $b_4a_{24}$).

The partial result vectors are merged to generate the final result for vector 150, i.e., element $c_0$ is equal to $b_0a_0+b_1a_1+b_2a_2+b_3a_3+b_4a_4$, element $c_1$ is equal to $b_0a_5+b_1a_6+b_2a_7+b_3a_8+b_4a_9$, element $c_2$ is equal to $b_0a_{10}+b_1a_{11}+b_2a_{12}+b_3a_{13}+b_4a_{14}$, element $c_3$ is equal to $b_0a_{15}+b_1a_{16}+b_2a_{17}+b_3a_{18}+b_4a_{19}$, and element $c_4$ is equal to $b_0a_{20}+b_1a_{21}+b_2a_{22}+b_3a_{23}+b_4a_{24}$. In some embodiments, the partial result vectors are merged in a single operation, while in other embodiments, the partial result vectors are merged in a sequence of partial merge operations.

Figure 4D:
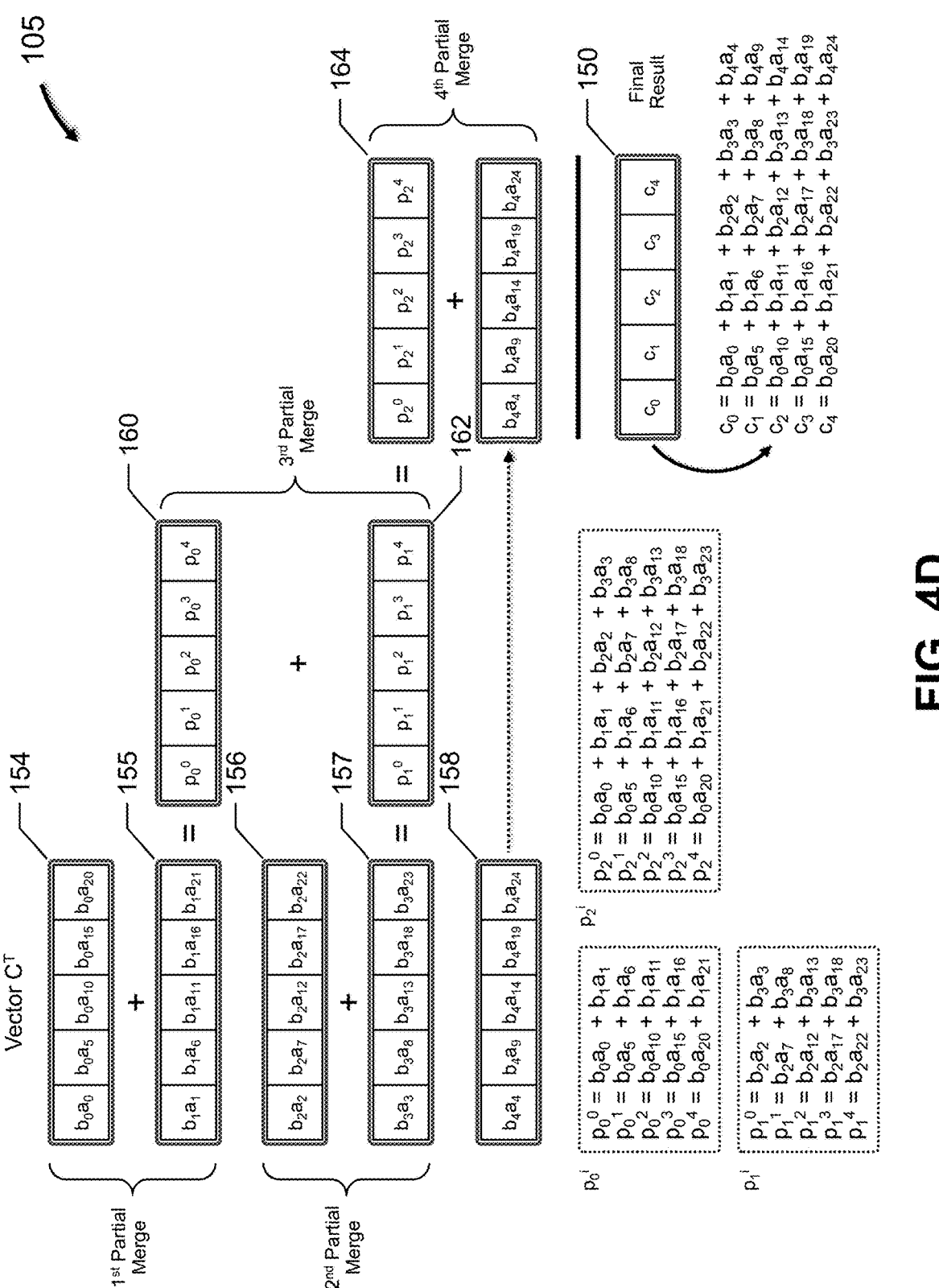
FIG. 4D depicts a merge operation, in accordance with an embodiment of the present disclosure.

FIG. 4D depicts merge operation 105, in accordance with an embodiment of the present disclosure.

In this embodiment, partial result vector 154 is merged with partial result vector 155 to generate intermediate partial result vector 160, partial result vector 156 is merged with partial result vector 157 to generate intermediate partial result vector 162, intermediate partial result vector 160 is merged with intermediate partial result vector 162 to generate intermediate partial result vector 164, and partial result vector 158 is merged with intermediate partial result vector 164 to the final result for generate vector 150.

Intermediate partial result vector 160 includes elements $p_0^0$, $p_0^1$, $p_0^2$, $p_0^3$, $p_0^4$, intermediate partial result vector 162 includes elements $p_1^0$, $p_1^1$, $p_1^2$, $p_1^3$, $p_1^4$, and intermediate partial result vector 164 includes elements $p_2^0$, $p_2^1$, $p_2^2$, $p_2^3$, $p_2^4$. For intermediate partial result vector 160, element $p_0^0$ is equal to $b_0a_0+b_1a_1$, element $p_0^1$ is equal to $b_0a_5+b_1a_6$, element $p_0^2$ is equal to $b_0a_{10}+b_1a_{11}$, element $p_0^3$ is equal to $b_0a_{15}+b_1a_{16}$, and element $p_0^4$ is equal to $b_0a_{20}+b_1a_{21}$. For intermediate partial result vector 162, element $p_1^0$ is equal to $b_2a_2+b_3a_3$, element $p_1^1$ is equal to $b_2a_7+b_3a_8$, element $p_1^2$ is equal to $b_2a_{12}+b_3a_{13}$, element $p_1^3$ is equal to $b_2a_{17}+b_3a_{18}$, and element $p_1^4$ is equal to $b_2a_{22}+b_3a_{23}$. For intermediate partial result vector 164, element $p_2^0$ is equal to $b_0a_0+b_1a_1+b_2a_2+b_3a_3$, element $p_2^1$ is equal to $b_0a_5+b_1a_6+b_2a_7+b_3a_8$, element $p_2^2$ is equal to $b_0a_{10}+b_1a_{11}+b_2a_{12}+b_3a_{13}$, element $p_2^3$ is equal to $b_0a_{15}+b_1a_{16}+b_2a_{17}+b_3a_{18}$, and element $p_2^4$ is equal to $b_0a_{20}+b_1a_{21}+b_2a_{22}+b_3a_{23}$.

The final result for vector 150 is the same as the final result for the standard matrix vector multiply operation described above.

Figures 5A, 5B:
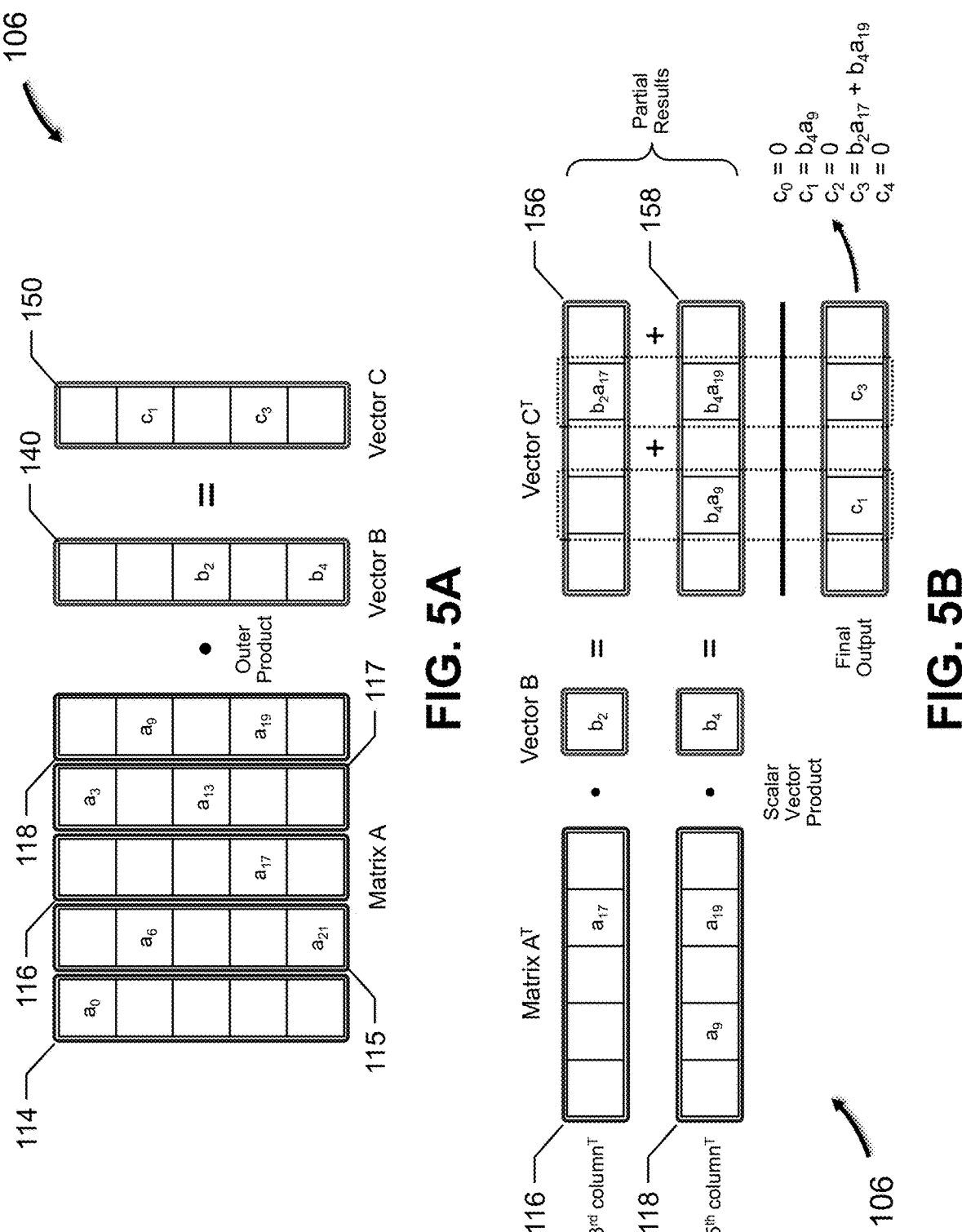
FIGS. 5A and 5B depict a matrix vector outer product, according to an embodiment of the present disclosure.

FIGS. 5A and 5B depict matrix vector outer product 106, according to an embodiment of the present disclosure.

In this embodiment, matrix 110 is a sparse matrix in which more than half of the elements have a value of 0, and vector 140 is a sparse vector in which more than half of the elements have a value of 0. The non-zero elements of matrix 110 are elements $a_0$, $a_3$, $a_6$, $a_8$, $a_{13}$, $a_{17}$, $a_{11}$ and $a_{21}$, while the non-zero elements of vector 140 are $b_2$ and $b_4$. Due to the sparsity of matrix 110 and vector 140, the outer product includes a reduced number of scalar vector calculations, which generate a reduced number of non-zero elements in vector 150, i.e., elements $c_1$ and $c_3$.

The first scalar vector calculation multiplies element $b_2$ ($3^{rd}$ row) with each of the non-zero elements of third column 116 (i.e., element $a_{17}$) to generate partial result vector 156 (i.e., 0, 0, 0, $b_2a_{17}$, 0). The second scalar vector calculation multiplies element $b_4$ ($5^{th}$ row) with each of the non-zero elements of fifth column 118 (i.e., elements $a_9$, $a_{19}$) to generate partial result vector 158 (i.e., 0, $b_4a_9$, 0, $b_4a_{19}$, 0).

The partial results are merged (or summed) to product the final result for vector 150, i.e., element $c_1$ is equal to $b_4a_9$, and element $c_3$ is equal to $b_2a_{17}+b_4a_{19}$.

Figures 5C, 5D:
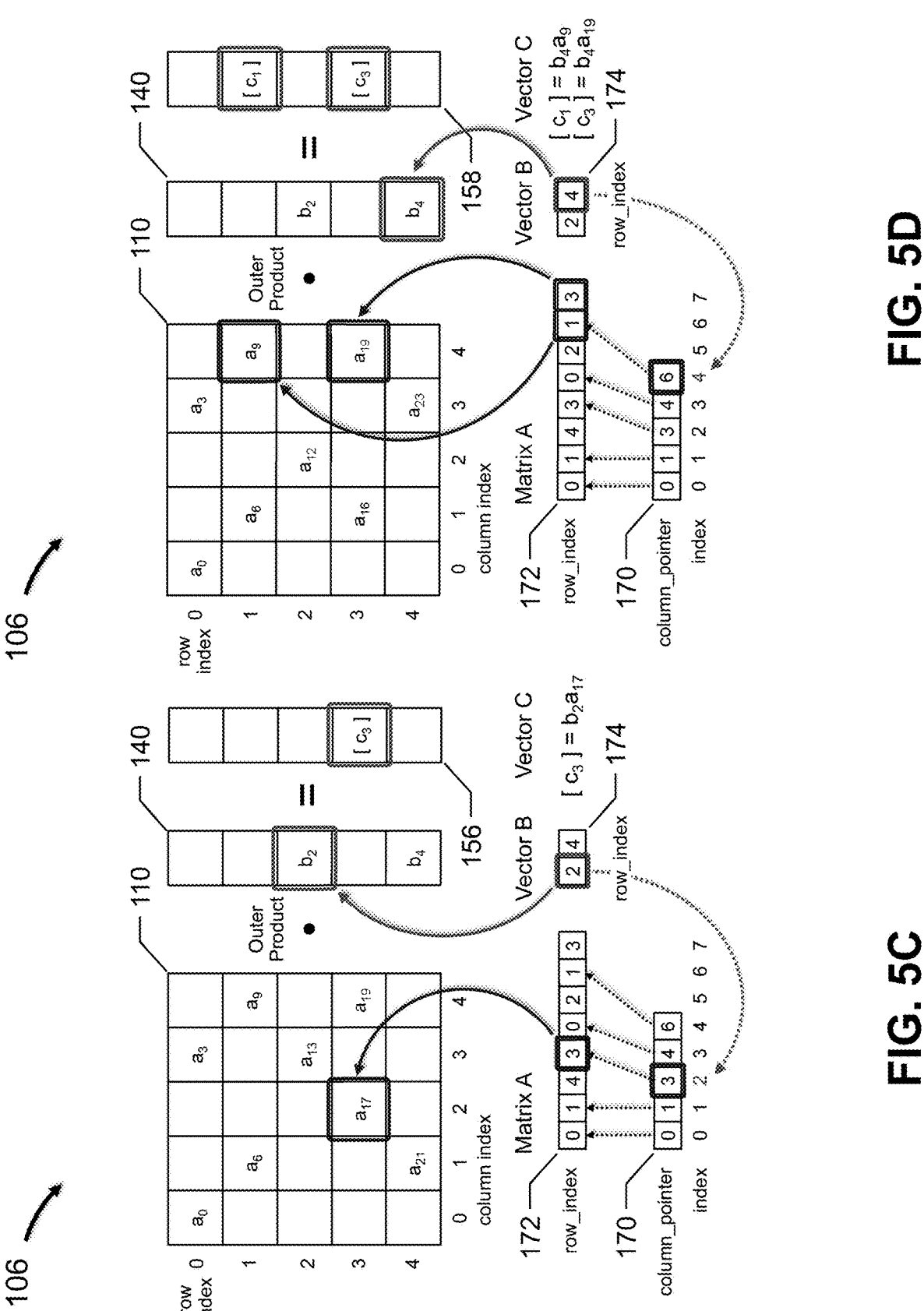
FIGS. 5C, 5D and 5E depict a matrix vector outer product, according to an embodiment of the present disclosure.
Figure 5E:
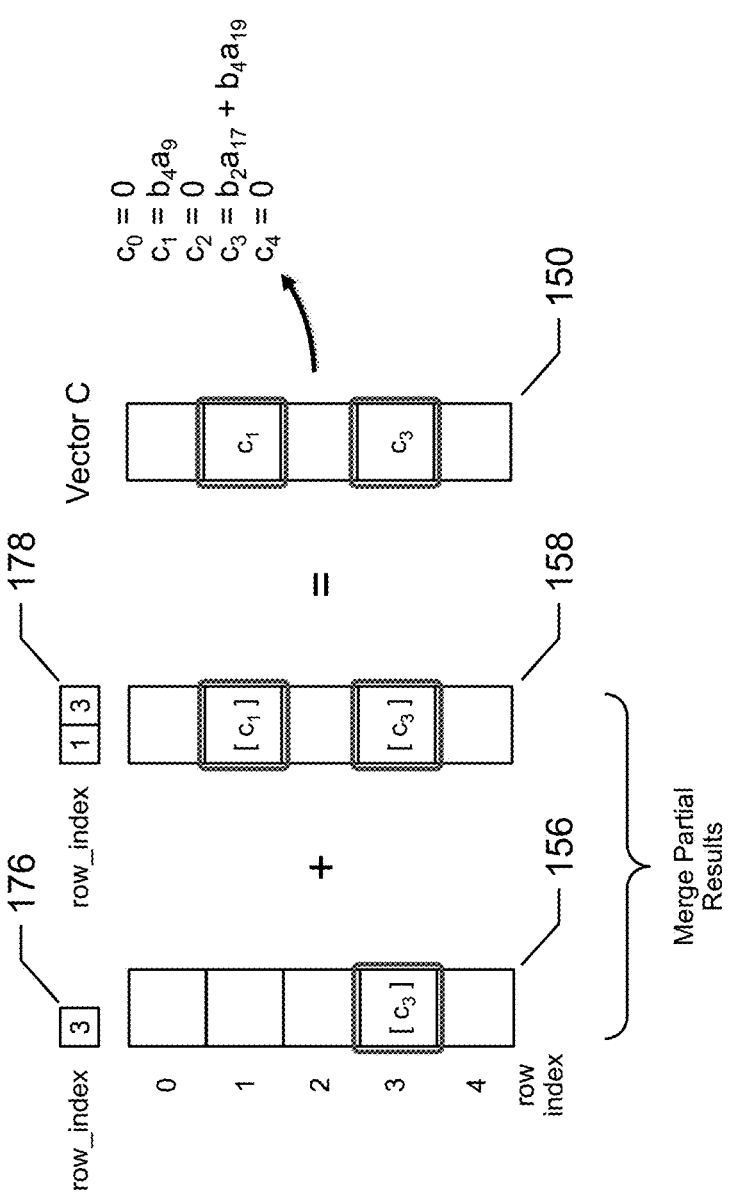

FIGS. 5C, 5D and 5E depict matrix vector outer product 106, according to an embodiment of the present disclosure.

This sequence of figures presents the same matrix vector outer product operation on matrix 110 and vector 140 as depicted FIGS. 5A and 5B with the addition of an indexing technique to identify the non-zero elements of matrix 110 and vector 140.

Generally, the non-zero elements of a matrix may be identified using a pair of index vectors or single dimension arrays. In one embodiment, the first index vector includes an element for each column, and the value of each element is the number of non-zero elements in all previous columns, such as, for example, 0, 1, 3, 4, 6, etc. The second index vector includes the row index for each non-zero element in each column, starting with an index value of 0. The second index vector generally includes a variable number of elements based on the number of non-zero element in the matrix, so an indexing technique must be used to access the row indices.

In this example, matrix 110 has first index vector 170 with 5 elements, i.e., one for each column, and a second index vector 172 with 8 elements, i.e., one for each non-zero element. The first element of first index vector 170 has a value of 0, which is the number of non-zero elements prior to the $1^{st}$ column, i.e., 0. The value of the first element of first index vector 170 is used as an index into the second index vector 172. The element of second index vector 172 at an index of 0 has a value of 0, which is the row index of the non-zero element in the $1^{st}$ column, i.e., $a_0$. The difference between the first and second elements of index vector 170, i.e., 1, indicates that there is only one non-zero element in the $1^{st}$ column.

The second element of first index vector 170 has a value of 1, which is the number of non-zero elements prior to the $2^{nd}$ column, i.e., the number of non-zero elements in the $1^{st}$ column. The value of the second element of first index vector 170 is used as an index into the second index vector 172. The element of second index vector 172 at an index of 1 has a value of 1, which is the row index of the first non-zero element in the $2^{nd}$ column, i.e., $a_6$. The difference between the second and third elements of index vector 170, i.e., 2, indicates that there is a second non-zero element in the $2^{nd}$ column. The element of second index vector 172 at an index of 2 has a value of 4, which is the row index of the second non-zero element in the $2^{nd}$ column, i.e., $a_{21}$.

The third element of first index vector 170 has a value of 3, which is the number of non-zero elements prior to the $3^{rd}$ column, i.e., the number of non-zero elements in the $1^{st}$ and $2^{nd}$ columns. The value of the third element of first index vector 170 is used as an index into the second index vector 172. The element of second index vector 172 at an index of 3 has a value of 3, which is the row index of the non-zero element in the $3^{rd}$ column, i.e., $a_{17}$. The difference between the third and fourth elements of index vector 170, i.e., 1, indicates that there is only one non-zero element in the $3^{rd}$ column.

The fourth element of first index vector 170 has a value of 4, which is the number of non-zero elements prior to the $4^{th}$ column, i.e., the number of non-zero elements in the $1^{st}$, $2^{nd}$ and $3^{rd}$ columns. The value of the fourth element of first index vector 170 is used as an index into the second index vector 172. The element of second index vector 172 at an index of 4 has a value of 0, which is the row index of the first non-zero element in the $4^{th}$ column, i.e., $a_3$. The difference between the fourth and fifth elements of index vector 170, i.e., 2, indicates that there is a second non-zero element in the $4^{th}$ column. The element of second index vector 172 at an index of 5 has a value of 2, which is the row index of the second non-zero element in the $4^{th}$ column, i.e., $a_{13}$.

The fifth element of first index vector 170 has a value of 6, which is the number of non-zero elements prior to the $5^{th}$ column, i.e., the number of non-zero elements in the $1^{st}$, $2^{nd}$, $3^{rd}$ and $4^{th}$ columns. The value of the fourth element of first index vector 170 is used as an index into the second index vector 172. The element of second index vector 172 at an index of 6 has a value of 1, which is the row index of the first non-zero element in the $5^{th}$ column, i.e., as. The difference between the sixth element of index vector 170 (i.e., 6) and the size of second index vector 172 (i.e., 8), i.e., 2, indicates that there is a second non-zero element in the $5^{th}$ column. The element of second index vector 172 at an index of 7 has a value of 3, which is the row index of the second non-zero element in the $5^{th}$ column, i.e., $a_{19}$. Alternatively, first index vector 170 may include a seventh (last) element having a value of 8, and the difference between the sixth and seventh elements of index vector 170, i.e., 2, indicates that there is a second non-zero element in the $5^{th}$ column.

Generally, the non-zero elements of a vector may be identified using a single index vector or single dimension array. In this embodiment, the index vector includes the row index for each non-zero element in each column, starting with an index value of 0. The second index vector generally includes a variable number of elements based on the number of non-zero element in the vector.

In this example, vector 140 has index vector 174 with 2 elements, i.e., one for each non-zero element. The first element of index vector 174 has a value of 2, which is the row index of the first non-zero element in vector 140, i.e., $b_2$. The second element of index vector 174 has a value of 4, which is the row index of the second non-zero element in vector 140, i.e., $b_4$.

Using the first index vector 170, second index vector 172 and index vector 174, the first scalar vector calculation multiplies element $b_2$ (identified by a row index of 2) with the non-zero element of the $3^{rd}$ column of matrix 110, i.e., element $a_{17}$ (identified by a column index of 2 and a row index of 3) to generate partial result vector 156 including element $[c_3]$, i.e., $b_2a_{17}$. Partial result vector 156 is formed from partial result $[c_3]$ and may have a row index 176 identifying the index of the non-zero partial results elements, as depicted in FIG. 5C.

The second scalar vector calculation multiplies element $b_4$ (identified by a row index of 4) with the first non-zero element of the $5^{th}$ column of matrix 110, i.e., element as (identified by a column index of 4 and a row index of 1), to generate partial result $[c_1]$, i.e., $b_4a_9$. The second scalar vector calculation also multiplies element $b_4$ (identified by a row index of 4) with the second non-zero element of the $5^{th}$ column of matrix 110, i.e., element $a_1$ (identified by a column index of 4 and a row index of 3), to generate partial result $[c_3]$, i.e., $b_4a_{19}$. Partial result vector 158 is formed from partial results $[c_1]$, i.e., $b_4a_9$, and $[c_3]$, i.e., $b_4a_{19}$, and may have a row index 178 identifying the indices of the non-zero partial results elements, as depicted in FIG. 5D.

Partial result vectors 156 and 158 are merged (or summed) to product the final result for vector 150, i.e., element $c_1$ is equal to $b_4a_9$, and element $c_3$ is equal to $b_2a_{17}+b_4a_{19}$, as depicted in FIG. 5E.

As described above, partial results vectors 156 and 158 are sparse vectors. Generally, while any vector may be represented by an index vector or single dimension array and a compact data vector or single dimension array, this form of representation is particularly advantageous for sparse vectors.

Figure 6A:
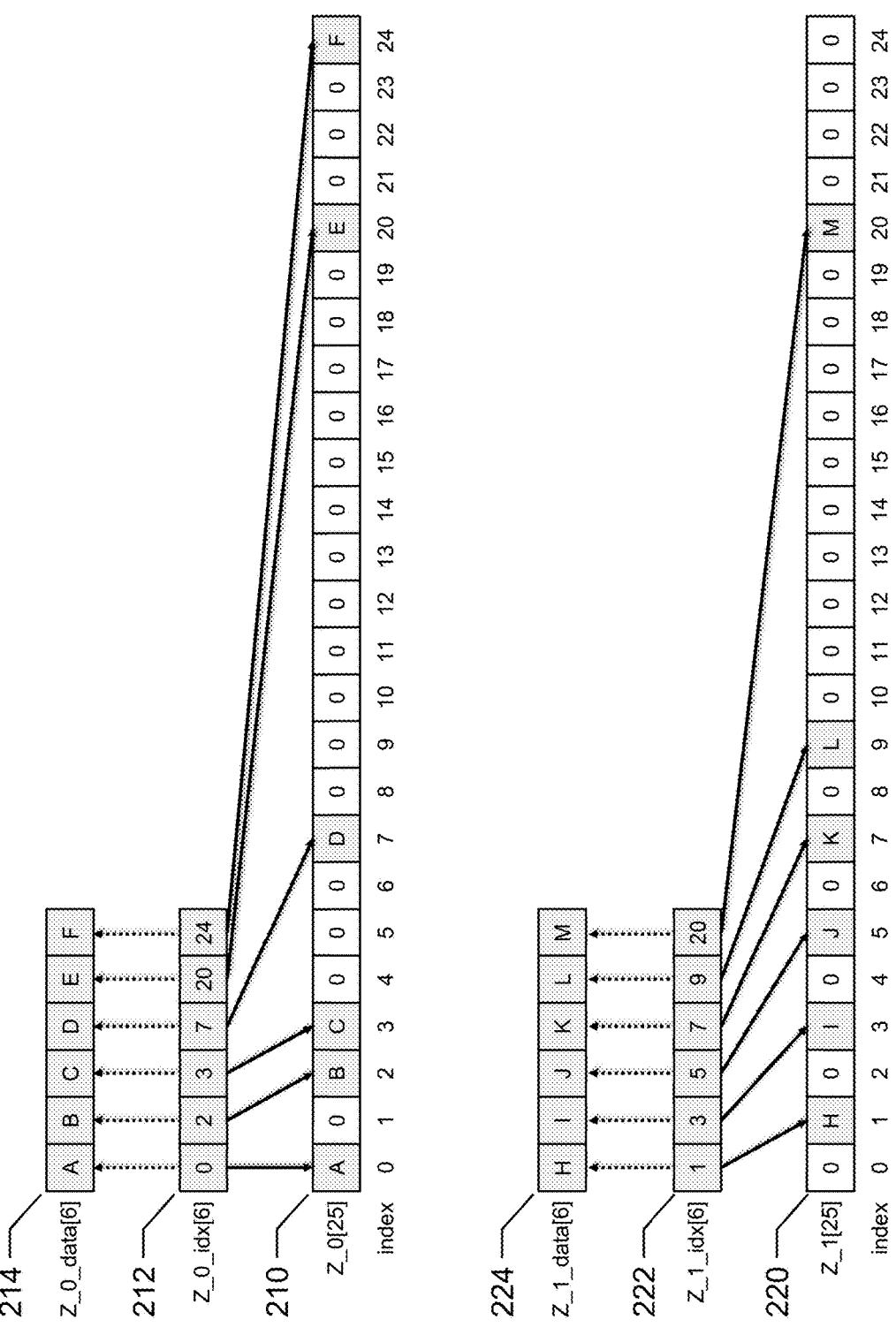
FIG. 6A depicts two sparse vectors, in accordance with an embodiment of the present disclosure.

FIG. 6A depicts two sparse vectors 210 and 220, in accordance with an embodiment of the present disclosure.

Vector 210 (i.e., Z_0[25]) has 25 elements including 6 elements that have non-zero values and 19 elements that have zero values. Using an indexing system that starts at 0, elements Z_0[0], Z_0[2], Z_0[3], Z_0[7], Z_0[20] and Z_0 [24] have non-zero values generically represented by A, B, C, D, E and F, respectively. Index vector 212 (i.e., Z_0_idx [6]) is a 6 element, sorted vector that is formed from these index values, and includes element Z_0_idx[0] having a value of 0, element Z_0_idx[1] having a value of 2, element Z_0_idx[2] having a value of 3, element Z_0_idx[3] having a value of 7, element Z_0_idx[4] having a value of 20, and element Z_0_idx[5] having a value of 24. Data vector 214 (i.e., Z_0_data[6]) is a 6 element vector that is formed from the non-zero values, and includes element Z_0_data[0] having a value of A, element Z_0_data[1] having a value of B, element Z_0_data[2] having a value of C, element Z_0_data[3] having a value of D, element Z_0_data[4] having a value of E, and element Z_0_data[5] having a value of F.

Vector 220 (i.e., Z_1[25]) also has 25 elements including 6 elements that have non-zero values and 19 elements that have zero values. Using an indexing system that starts at 0, elements Z_1 [1], Z_1 [3], Z_1 [5], Z_1 [7], Z_1 [9] and Z_1[20] have non-zero values generically represented by H, I, J, K, L and M, respectively. Index vector 222 (i.e., Z_1_idx[6]) is a 6 element, sorted vector that is formed from these index values, and includes element Z_1_idx[0] having a value of 1, element Z_1_idx[1] having a value of 3, element Z_1_idx[2] having a value of 5, element Z_1_idx[3] having a value of 7, element Z_1_idx[4] having a value of 9, and element Z_1_idx[5] having a value of 20. Data vector 224 (i.e., Z_1_data[6]) is a 6 element vector that is formed from the non-zero values, and includes element Z_0_data[0] having a value of H, element Z_0_data[1] having a value of I, element Z_0_data[2] having a value of J, element Z_0_data[3] having a value of K, element Z_0_data[4] having a value of L, and element Z_0_data[5] having a value of M.

In another embodiment, index vectors 212 and 222 may be used to access the non-zero-valued data within vectors 210 and 220, respectively, and data vectors 214 and 224 may not be needed. For example, the following pseudocode loop accesses the non-zero valued data in vector 210 and stores the data in Z_0_data[ ]:

```
for (i=0; i<6; i++) {
    Z_0_data[ i ] = Z_0[ Z_0_idx[ i ] ];
}
```

Vectors 210 and 220, index vectors 212 and 222, and data vectors 214 and 224 may be stored, generally, in memory, vector registers, etc., for further processing, such as merge operations of the indices or the data.

Merging sparse vectors is very useful for sparse arithmetic problems, such as, for example, multiplying two sparse matrices, multiplying a sparse matrix and a sparse vector, etc., as discussed above. Additionally, merging vectors that simply include a list of numbers without associated data is also very useful. In other words, rather than being sparse vectors, vector 210 may include index vector 212 without associated data, while vector 220 may include index vector

212 without associated data. For instance, analyzing the structure or connectedness of a graph may not require accessing the weights of the edges of that graph (i.e., the data). These problems follow the same matrix*matrix or matrix*vector process, using ones (for non-zero values) and zeros, which would be represented by lists of indices in the results. In one example, a breadth-first search to find whether two nodes are connected by any series of edges may be implemented by iterations of logical matrix*vector, resulting in a list of connected nodes which are checked to determine whether a certain node in the graph is connected to the starting node.

In another example, index vector 212 may be a sorted list of factors for a first number, index vector 222 may be a sorted list of factors for a second number, and the sorted merged vector (or list) is a sorted list of factors for the product of the first and second numbers. Importantly, embodiments of the present disclosure may be applied to data that include, or may be divided into, densely-populated vectors, or a combination of densely-populated vectors and one or more sparse vectors, etc.

Figure 6B:
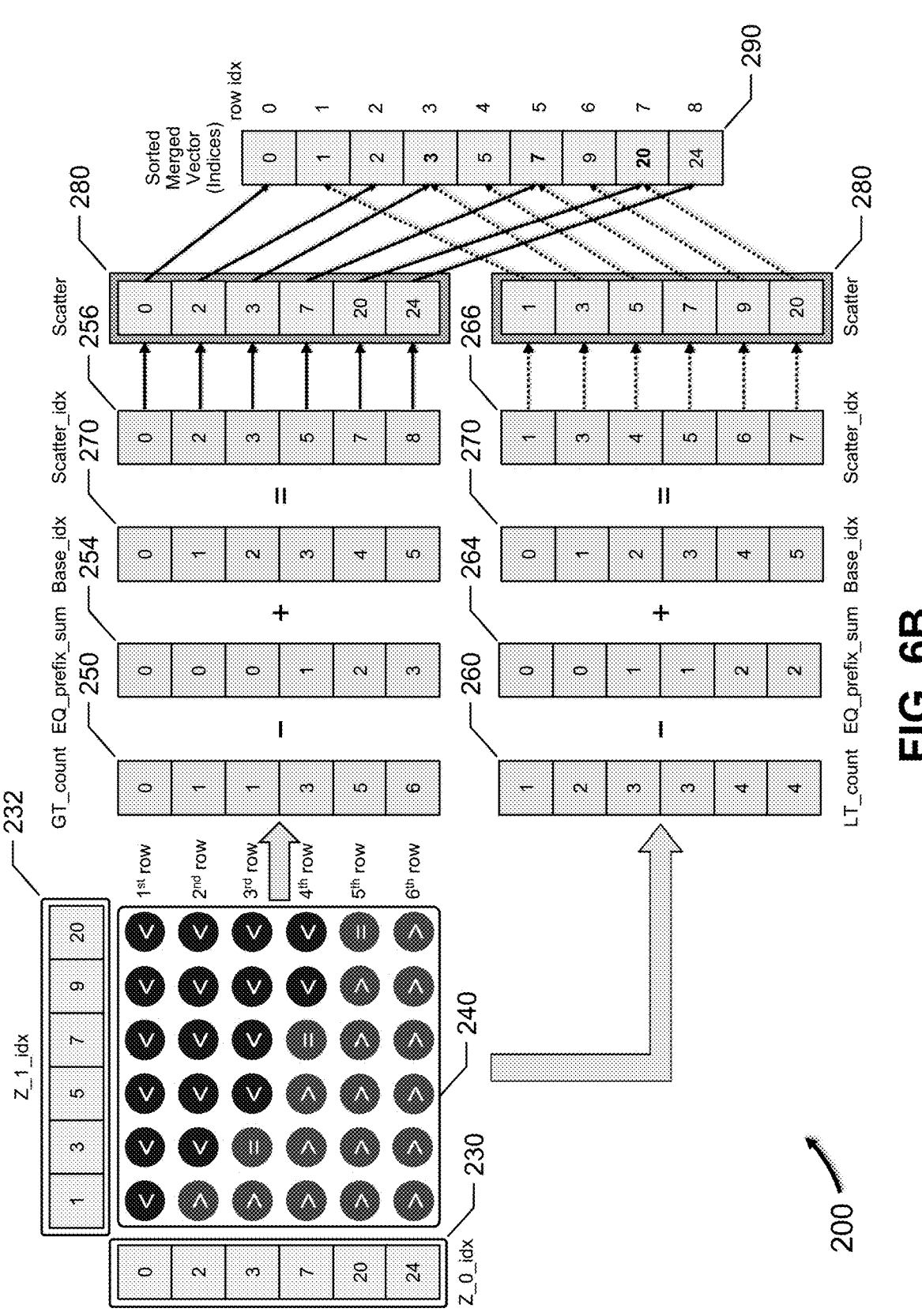
FIGS. 6B and 6C depict a merge operation of two vectors of sorted indices, according to an embodiment of the present disclosure.
Figure 6C:
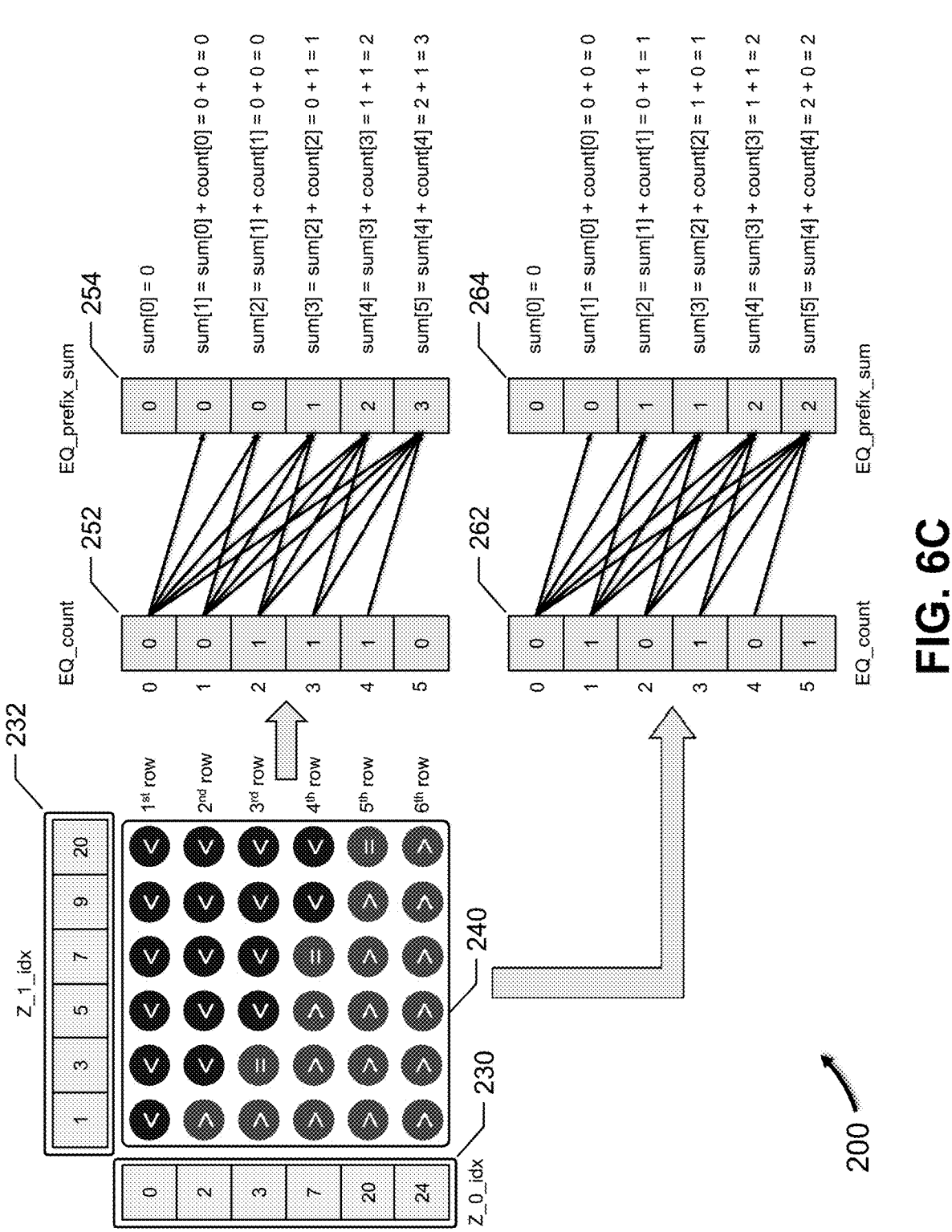

FIGS. 6B and 6C depict merge operation 200 of two vectors of sorted indices, according to an embodiment of the present disclosure.

Index vector 212 is stored in vector register 230 and index vector 222 is stored in vector register 232; other memory may also be used. Two-dimensional (2D) comparator array 240 includes an array of comparators 242 that compare the values stored in vector register 230 with the values stored in vector register 232 to determine whether the values in vector register 230 are equal to (i.e., "="), less than (i.e., "<") or greater than (i.e., ">") the values stored in vector register 232. Vector registers 230, 232 and comparator array 240 are generally sized to support the sizes of index vectors 212 and 222; in this embodiment, comparator array 240 is a 6×6 array. In certain embodiments, comparator array 240 is a two-dimensional (2D) multiply-and-accumulate (MAC) array to which comparators 242 have been added to each array element. In other embodiments, vector registers 230, 232 and comparator array 240 may be replaced by one or more processor instructions that perform the comparison operations, as discussed below.

Generally, merge operation 200 reads vectors 210 and 220 from storage (e.g., memory) and stores index vectors 212 and 222 in vector registers 230 and 232, respectively. Merge operation 200 then compares the index values in vector registers 230 and 232 using comparator array 240, and generates several intermediate vectors for each vector 210 and 220 based on the outputs of comparator array 240. The intermediate vectors for vector 210 include GT_count vector 250, EQ_count vector 252 and EQ_prefix_sum vector 254, while the intermediate vectors for vector 220 include LT_count vector 260, EQ_count vector 262 and EQ_prefix_sum vector 264.

Merge operation 200 then generates scatter index vector 256 for vector 210 and scatter index vector 266 for vector 220 based on the respective intermediate vectors and baseline index vector 270. Merge operation 200 then executes a scatter operation, using scatter index vectors 256 and 266, on index vectors 212 and 222 (or data vectors 214 and 224), respectively, to generate sorted merged vector 290 of indices (or data, as discussed below). The intermediate vectors, baseline index vector 270, scatter index vectors 256 and 266 and sorted merged vector 290 may be stored in vector registers, memory, etc.

With respect to the comparison operation, the comparators 242 in the first row of comparator array 240 compare the first element of vector register 230, i.e., Z_0_idx[0] having a value of 0, to all of the elements of vector register 232, i.e., Z_1_idx[0], . . . , Z_1_idx[5] having the values of 1, 3, 5, 7, 9 and 20. In this example, all 6 comparators 242 of the first row output a value representing "<".

The comparators 242 in the second row of comparator array 240 compare the second element of vector register 230, i.e., Z_0_idx[1] having a value of 2, to all of the elements of vector register 232, i.e., Z_1_idx[0], . . . , Z_1_idx[5]. In this example, the first comparator 242 outputs a value representing ">", while the remaining 5 comparators 242 output a value representing "<".

The comparators 242 in the third row of comparator array 240 compare the third element of vector register 230, i.e., Z_0_idx[2] having a value of 3, to all of the elements of vector register 232, i.e., Z_1_idx[0], . . . , Z_1_idx[5]. In this example, the first comparator 242 outputs a value representing ">", the second comparator outputs a value representing "=", while the remaining 4 comparators 242 output a value representing "<".

The comparators 242 in the fourth row of comparator array 240 compare the fourth element of vector register 230, i.e., Z_0_idx[3] having a value of 7, to all of the elements of vector register 232, i.e., Z_1_idx[0], . . . , Z_1_idx[5]. In this example, the first, second and third comparators 242 output a value representing ">", the fourth comparator outputs a value representing "=", and the remaining 2 comparators 242 output a value representing "<".

The comparators 242 in the fifth row of comparator array 240 compare the fifth element of vector register 230, i.e., Z_0_idx[4] having a value of 20, to all of the elements of vector register 232, i.e., Z_1_idx[0], . . . , Z_1_idx[5]. In this example, the first 5 comparators 242 output a value representing ">", while the last comparator 242 outputs a value representing "=".

The comparators 242 in the sixth row of comparator array 240 compare the sixth element of vector register 230, i.e., Z_0_idx[5] having a value of 24, to all of the elements of vector register 232, i.e., Z_1_idx[0], . . . , Z_1_idx[5]. In this example, all 6 comparators 242 output a value representing ">".

The outputs of the comparators 242 are used to generate several intermediate vectors for each index vector, including GT_count vector 250 and EQ_count vector 252 for index vector 212, and LT_count vector 260 and EQ_count vector 262 for index vector 222. Additionally, EQ_prefix_sum vector 254 is generated based on EQ_count vector 252, and EQ_prefix_sum vector 264 is generated based on EQ_count vector 262. Scatter index vector 256 for index vector 212 is generated based on GT_count vector 250, EQ_prefix_sum vector 254 and baseline index vector 270, while scatter index vector 266 for index vector 222 is generated based on LT_count vector 260, EQ_prefix_sum vector 264 and baseline index vector 270.

More particularly, GT_count vector 250 is generated by counting the number of output values that represent ">" in each row of comparator array 240. The $1^{st}$ row has 0 output values that represent ">", the $2^{nd}$ row has 1 output value that represents ">", the $3^{rd}$ row has 1 output value that represents ">", the $4^{th}$ row has 3 output values that represent ">", the $5^{th}$ row has 5 output values that represent ">", and the $6^{th}$ row has 6 output values that represent ">". Consequently, GT_count vector 250 includes 6 elements having the values of 0, 1, 1, 3, 5, 6.

Similarly, LT_count vector 260 is generated by counting the number of output values that represent "<" in each column of comparator array 240. The $1^{st}$ column has 1 output value that represents "<", the $2^{nd}$ column has 2 output values that represent "<", the $3^{rd}$ column has 3 output values that represent "<", the $4^{th}$ column has 3 output values that represent "<", the $5^{th}$ column has 4 output values that represent "<" and the $6^{th}$ column has 4 output values that represent "<". Consequently, LT_count vector 260 includes 6 elements having the values of 1, 2, 3, 3, 4, 4.

EQ_count vector 252 is generated by counting the number of output values that represent "=" in each row of comparator array 240. The $1^{st}$ row has 0 output values that represent "=", the $2^{nd}$ row has 0 output values that represent "=", the $3^{rd}$ row has 1 output value that represents "=", the $4^{th}$ row has 1 output value that represents the $5^{th}$ row has 1 output value that represents "=", and the $6^{th}$ row has 0 output values that represent "=". Consequently, EQ_count vector 252 includes 6 elements having the values of 0, 0, 1, 1, 1, 0.

Similarly, EQ_count vector 262 is generated by counting the number of output values that represent "=" in each column of comparator array 240. The $1^{st}$ column has 0 output values that represent "=", the $2^{nd}$ column has 1 output value that represents "=", the $3^{rd}$ column has 0 output values that represent "=", the $4^{th}$ column has 1 output value that represents "=", the $5^{th}$ column has 0 output values that represent and the $6^{th}$ column has 1 output value that represents "=". Consequently, EQ_count vector 262 includes 6 elements having the values of 0, 1, 0, 1, 0, 1.

EQ_prefix_sum vector 254 is generated based on EQ_count vector 252 as follows. The first element is equal to 0, the second element is equal to the value of the $1^{st}$ element of EQ_count vector 252, i.e., 0, the third element is equal to the sum of the $1^{st}$ and $2^{nd}$ elements of EQ_count vector 252, i.e., 0=0+0, the fourth element is equal to the sum of the $1^{st}$, $2^{nd}$ and $3^{rd}$ elements of EQ_count vector 252, i.e., 1=0+0+1, the fifth element is equal to the sum of the $1^{st}$, $2^{nd}$, $3^{rd}$ and $4^{th}$ elements of EQ_count vector 252, i.e., 2=0+0+1+1, and the sixth element is equal to the sum of the $1^{st}$, $2^{nd}$, $3^{rd}$, $4^{th}$ and $5^{th}$ elements of EQ_count vector 252, i.e., 3=0+0+1+1+1. Consequently, EQ_prefix_sum vector 254 includes 6 elements having the values of 0, 0, 0, 1, 2, 3.

The following pseudocode loop illustrates another technique for generation the EQ_prefix_sum vectors:

```
EQ_prefix_sum[ 0 ] = 0;
for (i=1; i<6; i++) {
    EQ_prefix_sum[ i ] = EQ_prefix_sum[ i-1 ] +
    EQ_count[ i-1];
}
```

EQ_prefix_sum vector 264 is generated based on EQ_count vector 262 as follows. The first element is equal to 0, the second element is equal to the value of the $1^{st}$ element of EQ_count vector 262, i.e., 0, the third element is equal to the sum of the $1^{st}$ and $2^{nd}$ elements of EQ_count vector 262, i.e., 1=0+1, the fourth element is equal to the sum of the $1^{st}$, $2^{nd}$ and $3^{rd}$ elements of EQ_count vector 262, i.e., 1=0+1+0, the fifth element is equal to the sum of the $1^{st}$, $2^{nd}$, $3^{rd}$ and $4^{th}$ elements of EQ_count vector 262, i.e., 2=0+1+0+1, and the sixth element is equal to the sum of the $1^{st}$, $2^{nd}$, $3^{rd}$, $4^{th}$ and $5^{th}$ elements of EQ_count vector 262, i.e., 2=0+1+0+1+0. Consequently, EQ_prefix_sum vector 264 includes 6 elements having the values of 0, 0, 1, 1, 2, 2.

Baseline index vector 270 includes 6 elements having values equal to their respective row indices, i.e., 0, 1, 2, 3, 4, 5. In other embodiments, if vectors 210 and 220 are not already sorted, then baseline index vector 270 may include greater than counts of this vector with respect to its own elements.

Scatter index vector 256 is generated by subtracting EQ_prefix_sum vector 254 from GT_count vector 250 and adding baseline index vector 270. The first element is equal to 0, i.e., 0=0−0+0, the second element is equal to 2, i.e., 2=1−0+1, the second element is equal to 3, i.e., 3=1−0+2, the fourth element is equal to 5, i.e., 5=3−1+3, the fifth element is equal to 7, i.e., 7=5−2+4, and the sixth element is equal to 8, i.e., 8=6−3+5. Consequently, scatter index vector 256 includes 6 elements having the values of 0, 2, 3, 5, 7, 8.

Similarly, scatter index vector 266 is generated by subtracting EQ_prefix_sum vector 264 from LT_count vector 260 and adding baseline index vector 270. The first element is equal to 1, i.e., 1=1−0+0, the second element is equal to 3, i.e., 3=2−0+1, the second element is equal to 4, i.e., 4=3−1+2, the fourth element is equal to 5, i.e., 5=3−1+3, the fifth element is equal to 6, i.e., 6=4−2+4, and the sixth element is equal to 7, i.e., 7=4−2+5. Consequently, scatter index vector 256 includes 6 elements having the values of 1, 3, 4, 5, 6, 7.

Scatter operation 280 merges index vectors 212 and 222 into sorted merged vector 290 using scatter index vectors 256 and 266, respectively. When index values from index vectors 212 and 222 are equal, they are scattered into the same element of sorted merged vector 290; the second value simply overwrites the first value in storage.

With respect to vector 210, the first element of index vector 212 (having a value of 0) is scattered, using the first element of scatter index vector 256 (having a value of 0), into the first element of sorted merged vector 290 (having a row index 0). The second element of index vector 212 (having a value of 2) is scattered, using the second element of scatter index vector 256 (having a value of 2), into the third element of sorted merged vector 290 (having a row index 2). The third element of index vector 212 (having a value of 3) is scattered, using the third element of scatter index vector 256 (having a value of 3), into the fourth element of sorted merged vector 290 (having a row index 3). The fourth element of index vector 212 (having a value of 7) is scattered, using the fourth element of scatter index vector 256 (having a value of 5), into the sixth element of sorted merged vector 290 (having a row index 5). The fifth element of index vector 212 (having a value of 20) is scattered, using the fifth element of scatter index vector 256 (having a value of 7), into the eighth element of sorted merged vector 290 (having a row index 7). The sixth element of index vector 212 (having a value of 24) is scattered, using the sixth element of scatter index vector 256 (having a value of 8), into the ninth element of sorted merged vector 290 (having a row index 8).

With respect to vector 220, the first element of index vector 222 (having a value of 1) is scattered, using the first element of scatter index vector 266 (having a value of 1), into the second element of sorted merged vector 290 (having a row index 1). The second element of index vector 222 (having a value of 3) is scattered, using the second element of scatter index vector 266 (having a value of 3), into the fourth element of sorted merged vector 290 (having a row index 3). The third element of index vector 222 (having a value of 5) is scattered, using the third element of scatter index vector 266 (having a value of 4), into the fifth element of sorted merged vector 290 (having a row index 4). The fourth element of index vector 222 (having a value of 7) is scattered, using the fourth element of scatter index vector

266 (having a value of 5), into the sixth element of sorted merged vector 290 (having a row index 5). The fifth element of index vector 222 (having a value of 9) is scattered, using the fifth element of scatter index vector 266 (having a value of 6), into the seventh element of sorted merged vector 290 (having a row index 6). The sixth element of index vector 222 (having a value of 20) is scattered, using the sixth element of scatter index vector 266 (having a value of 7), into the eighth element of sorted merged vector 290 (having a row index 7).

Consequently, sorted merged vector 290 includes 9 elements having the values of 0, 1, 2, 3, 5, 7, 9, 20, 24; three values were overwritten, i.e., 3, 5, 7.

In certain embodiments, scatter operation 280 is performed sequentially on index vectors 212 and 222, while in other embodiments, scatter index vectors 256 and 266 are concatenated into one large scatter index vector, index vectors 212 and 222 are concatenated into one large index vector, and scatter operation 280 is performed on the concatenated scatter index and index vectors.

Generally, scatter operation 280 may be expressed in pseudocode. In certain embodiments, the scatter operation may be expressed as a "Scatter" instruction:

```
Scatter V0, V1, V2    // where V0 is output vector,
                         V1 is input vector, and V2 is index vector.
```

Figure 6D:
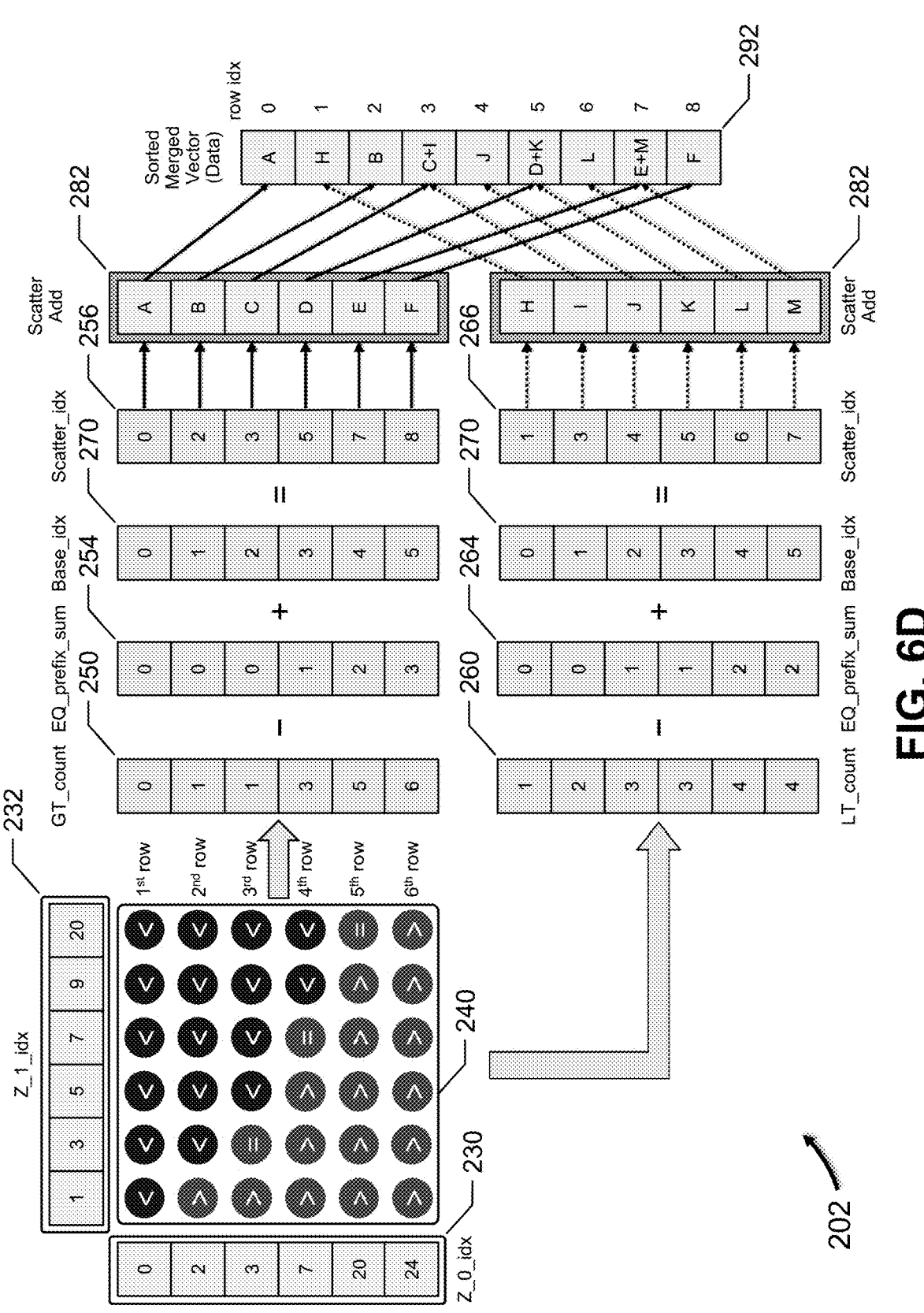
FIG. 6D depicts a merge operation of two vectors of sorted indices and data, according to an embodiment of the present disclosure.

FIG. 6D depicts merge operation 202 of two vectors of sorted indices and data, according to an embodiment of the present disclosure.

Merge operation 202 is basically the same as merge operation 200, with the replacement of scatter operation 280 with scatter add operation 282, which generates sorted merged vector 292.

Scatter add operation 282 merges data vectors 214 and 224 into sorted merged vector 292 using scatter index vectors 256 and 266, respectively. When index values from index vectors 212 and 222 are equal, the data value from vector 210 is stored in an element of sorted merged vector 292, and the data value from vector 220 is added to, or accumulated into, the same element of sorted merged vector 292.

In certain embodiments, scatter add operation 282 is performed sequentially on data vectors 214 and 224, while in other embodiments, scatter index vectors 256 and 266 are concatenated into one large scatter index vector, data vectors 214 and 224 are concatenated into one large data vector, and scatter add operation 282 is performed on the concatenated scatter index and data vectors.

With respect to vector 210, the first element of data vector 214 (having a value of A) is scattered, using the first element of scatter index vector 256 (having a value of 0), into the first element of sorted merged vector 290 (having a row index 0). The second element of data vector 214 (having a value of B) is scattered, using the second element of scatter index vector 256 (having a value of 2), into the third element of sorted merged vector 290 (having a row index 2). The third element of data vector 214 (having a value of C) is scattered, using the third element of scatter index vector 256 (having a value of 3), into the fourth element of sorted merged vector 290 (having a row index 3).

The fourth element of data vector 214 (having a value of D) is scattered, using the fourth element of scatter index vector 256 (having a value of 5), into the sixth element of sorted merged vector 290 (having a row index 5). The fifth element of data vector 214 (having a value of E) is scattered, using the fifth element of scatter index vector 256 (having a value of 7), into the eighth element of sorted merged vector 290 (having a row index 7). The sixth element of data vector 214 (having a value of F) is scattered, using the sixth element of scatter index vector 256 (having a value of 8), into the ninth element of sorted merged vector 290 (having a row index 8).

With respect to vector 220, the first element of data vector 224 (having a value of H) is scattered, using the first element of scatter index vector 266 (having a value of 1), into the second element of sorted merged vector 292 (having a row index 1). The second element of data vector 224 (having a value of I) is scattered, using the second element of scatter index vector 266 (having a value of 3), and added or accumulated into the fourth element of sorted merged vector 292 (having a row index 3). The third element of data vector 224 (having a value of J) is scattered, using the third element of scatter index vector 266 (having a value of 4), into the fifth element of sorted merged vector 292 (having a row index 4).

The fourth element of data vector 224 (having a value of K) is scattered, using the fourth element of scatter index vector 266 (having a value of 5), added or accumulated into the sixth element of sorted merged vector 292 (having a row index 5). The fifth element of data vector 224 (having a value of L) is scattered, using the fifth element of scatter index vector 266 (having a value of 6), into the seventh element of sorted merged vector 292 (having a row index 6). The sixth element of data vector 224 (having a value of M) is scattered, using the sixth element of scatter index vector 266 (having a value of 7), added or accumulated into the eighth element of sorted merged vector 292 (having a row index 7).

Consequently, sorted merged vector 292 includes 9 elements having the values of A, H, B, C+I, J, D+K, L, E+M, F; three values were added together or accumulated, i.e., C+I, D+K, E+M.

The scatter add (or scatter accumulate) operation may be expressed in pseudocode. In certain embodiments, the scatter add operation may be expressed as a "ScatterAdd" instruction:

```
ScatterAdd V0, V1, V2    // where V0 is output vector,
                            V1 is input vector, and V2 is index vector.
```

In other embodiments, the scatter add operation may be implemented using multiple instructions, such as, for example, instructions to scatter both vectors, then calculate accumulated intersecting values, then scatter those, overwriting the previously written data, etc.

Figure 6E:
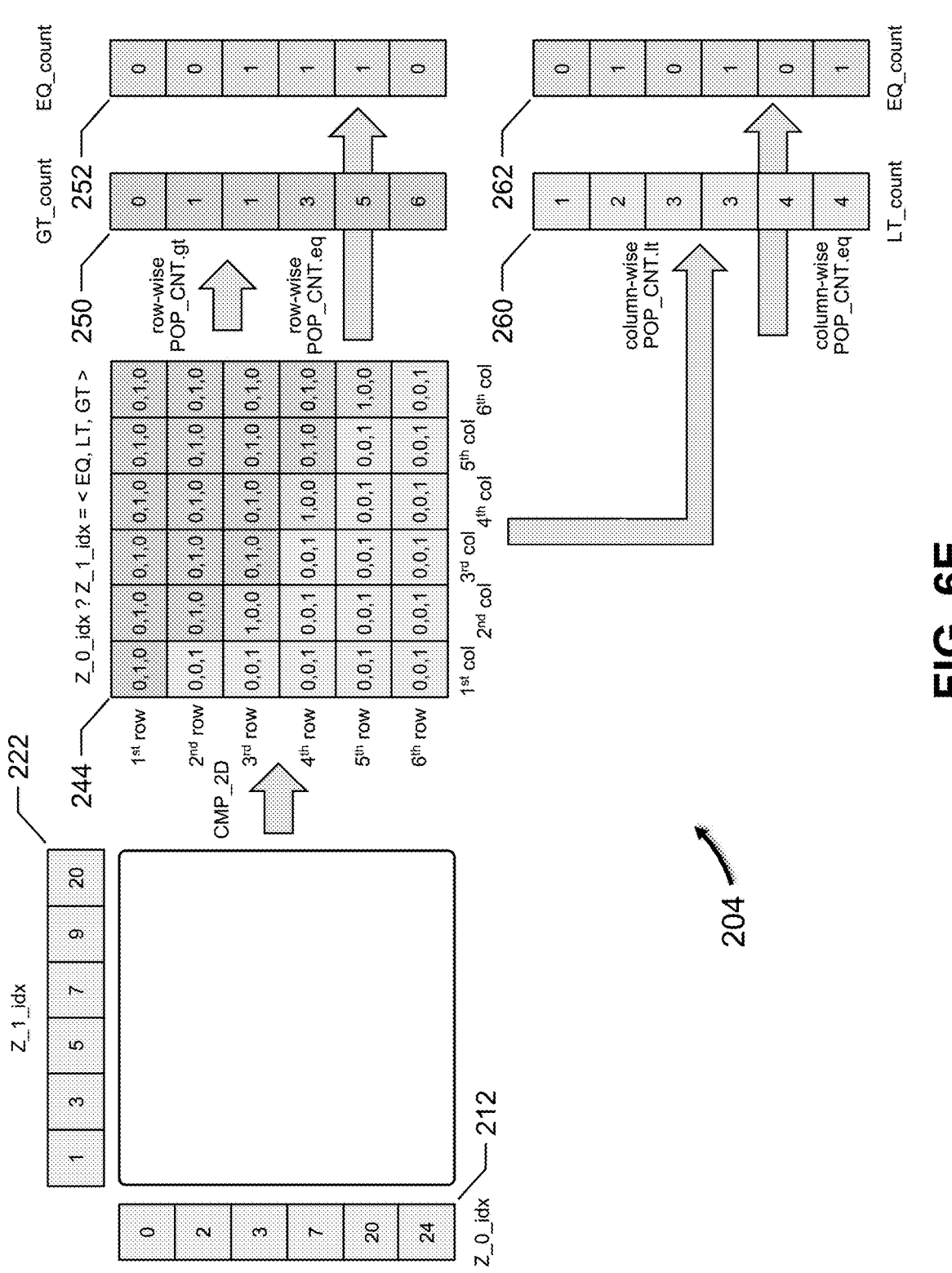
FIG. 6E depicts a merge operation of two vectors of sorted indices, according to an embodiment of the present disclosure.

FIG. 6E depicts merge operation 204 of two vectors of sorted indices, according to an embodiment of the present disclosure.

In this embodiment, vector registers 230, 232 and comparator array 240 have been replaced by processor instructions that perform comparison operations to generate data table 244, and perform row-wise and column-wise counting operations on data table 244 values to generate the intermediate vectors GT_count vector 250, EQ_count vector 252, LT_count vector 260, and EQ_count vector 262.

In one embodiment, the comparison operation is a processor instruction that may be generally described by the following pseudocode (other implementations are also contemplated):

```
CMP_2D          // Compare All To All
                // Inputs: Z_idx_0 (index vector 212), Z_idx_1 (index vector 222)
                // No outputs, generates 2D state in data table 244
Z_0_idx[ VL ];                         // Input 0, left side operand in FIG. 6E
Z_1_idx[ VL ];                         // Input 1, top operand in FIG. 6E
CMP_array[ VL ][ VL ];                 // data table 244, VL = vector length
For each row in Z_0_idx:               // For each row
    For each col in Z_1_idx:           // Moving through the row, each column
            CMP_array[ row ][ col ].eq = Z_0_idx[ row ] == Z_1_idx[ col ];
            CMP_array[ row ][ col ].lt = Z_0_idx[ row ] < Z_1_idx[ col ];
            CMP_array[ row ][ col ].gt = Z_0_idx[ row ] > Z_1_idx[ col ];
```

The elements "lt," "gt," and "eq" may may be condition codes, register bits in the 2D accumulator matrix, etc. The processor instruction compares each element of index vector 212 (i.e., Z_0_idx[i]) to index vector 222 (i.e., Z_1_idx[j]).

Index vectors 212 and 222 have a vector length of 6, so data table 244 includes 36 elements arranged as 6 rows and 6 columns. In this embodiments, each element includes a triplet of 3 bits, the first bit representing the "equal to" or "=" condition or Z_0_idx[i]=Z_1_idx[j], the second bit representing the "less than" or "<" condition or Z_0_idx[i]<Z_1_idx[j], and the third bit representing the "greater than" or ">" condition or Z_0_idx[i]>Z_1_idx[j]. Only one bit is set to 1 in each triplet; the remaining bits are set to 0 because the three conditions are mutually exclusive.

All of the elements of the first row of data table 244 have the same triplet value, i.e., 0,1,0. The first element of the second row has a triplet value of 0,0,1, while the remaining elements of the second row have a triplet value of 0,1,0. The first element of the third row has a triplet value of 0,0,1, the second element of the third row has a triplet value of 1,0,0, and the remaining elements of the third row have a triplet value of 0,1,0. The first, second and third elements of the fourth row have a triplet value of 0,0,1, the fourth element of the fourth row has a triplet value of 1,0,0, and the fifth and sixth elements of the fourth row have a triplet value of 0,1,0. The first five elements of the fifth row have a triplet value of 0,0,1, and the sixth element has a triplet value of 1,0,0. All of the elements of the sixth row have a triplet value of 0,0,1.

The row-wise greater than (GT) count operation is a processor instruction that may be generally described by the following pseudocode (other implementations are also contemplated):

```
POP_CNT.row.gt       // count 'greater than' results for rows
                     // No inputs, just read 2D state in CMP_array
                     // Output: vector Z_out
CMP_array [ VL ][ VL ];
Z_out[ VL ] = VL'0;        // start with zero'd output vector
For each row in CMP_array:
    For each col in CMP_array:
        If ( CMP_array[ row ][ col ].gt ):     // Test compare bit
                Z_out[ row ] += 1;   // accumulate over the row
```

The processor instruction POP_CNT.row.gt operates on data table 244 to generate GT_count vector 250.

The row-wise equal to (EQ) count operation is a processor instruction that may be generally described by the following pseudocode (other implementations are also contemplated):

```
POP_CNT.row.eq       // count 'equal to' results for rows
                     // No inputs, just read 2D state in CMP_array
                     // Output: vector Z_out
CMP_array [ VL ][ VL ];
Z_out[ VL ] = VL'0;        // start with zero'd output vector
```

-continued

```
For each row in CMP_array:
    For each col in CMP_array:
        If ( CMP_array[ row ][ col ].eq ):     // Test compare bit
                Z_out[ row ] += 1;   // accumulate over the row
```

The processor instruction POP_CNT.row.eq operates on data table 244 to generate EQ_count vector 252. EQ_prefix_sum vector 254 is calculated as described above, e.g., a simple loop, dedicated instruction, etc.

The column-wise greater than (LT) count operation is a processor instruction that may be generally described by the following pseudocode (other implementations are also contemplated):

```
POP_CNT.column.lt      // count 'less than' results for columns
                       // No inputs, just read 2D state in
                       CMP_array
                       // Output: vector Z_out
CMP_array [ VL ][ VL ];
Z_out[ VL ] = VL'0;        // start with zero'd output vector
For each col in CMP_array:
    For each row in CMP_array:
        If ( CMP_array[ row ][ col ].lt ):     // Test compare bit
            Z_out[ row ] += 1;     // accumulate over the row
```

The processor instruction POP_CNT.column.lt operates on data table 244 to generate LT_count vector 260.

The column-wise equal to (EQ) count operation is a processor instruction that may be generally described by the following pseudocode (other implementations are also contemplated):

```
POP_CNT.column.eq      // count 'equal to' results for columns
                       // No inputs, just read 2D state in
                       CMP_array
                       // Output: vector Z_out
CMP_array [ VL ][ VL ];
Z_out[ VL ] = VL'0;        // start with zero'd output vector
For each col in CMP_array:
    For each row in CMP_array:
        If ( CMP_array[ row ][ col ].eq ):     // Test compare bit
            Z_out[ row ] += 1;     // accumulate over the row
```

The processor instruction POP_CNT.column.eq operates on data table 244 to generate EQ_count vector 262. EQ_prefix_sum vector 264 is calculated as described above, e.g., a simple loop, dedicated instruction, etc.

Figure 7A:
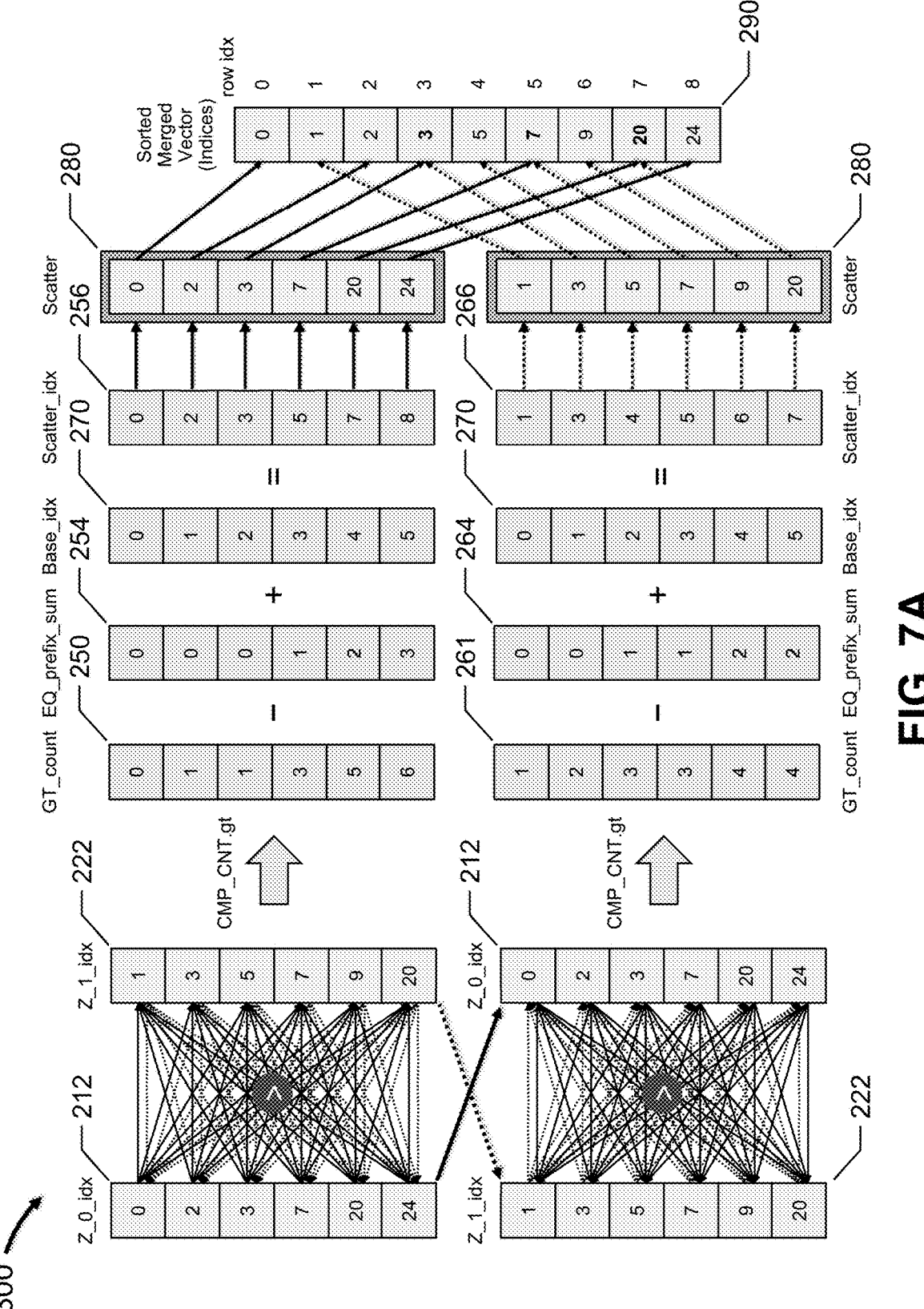
FIGS. 7A and 7B depict a merge operation of two vectors of sorted indices, according to an embodiment of the present disclosure.
Figure 7B:
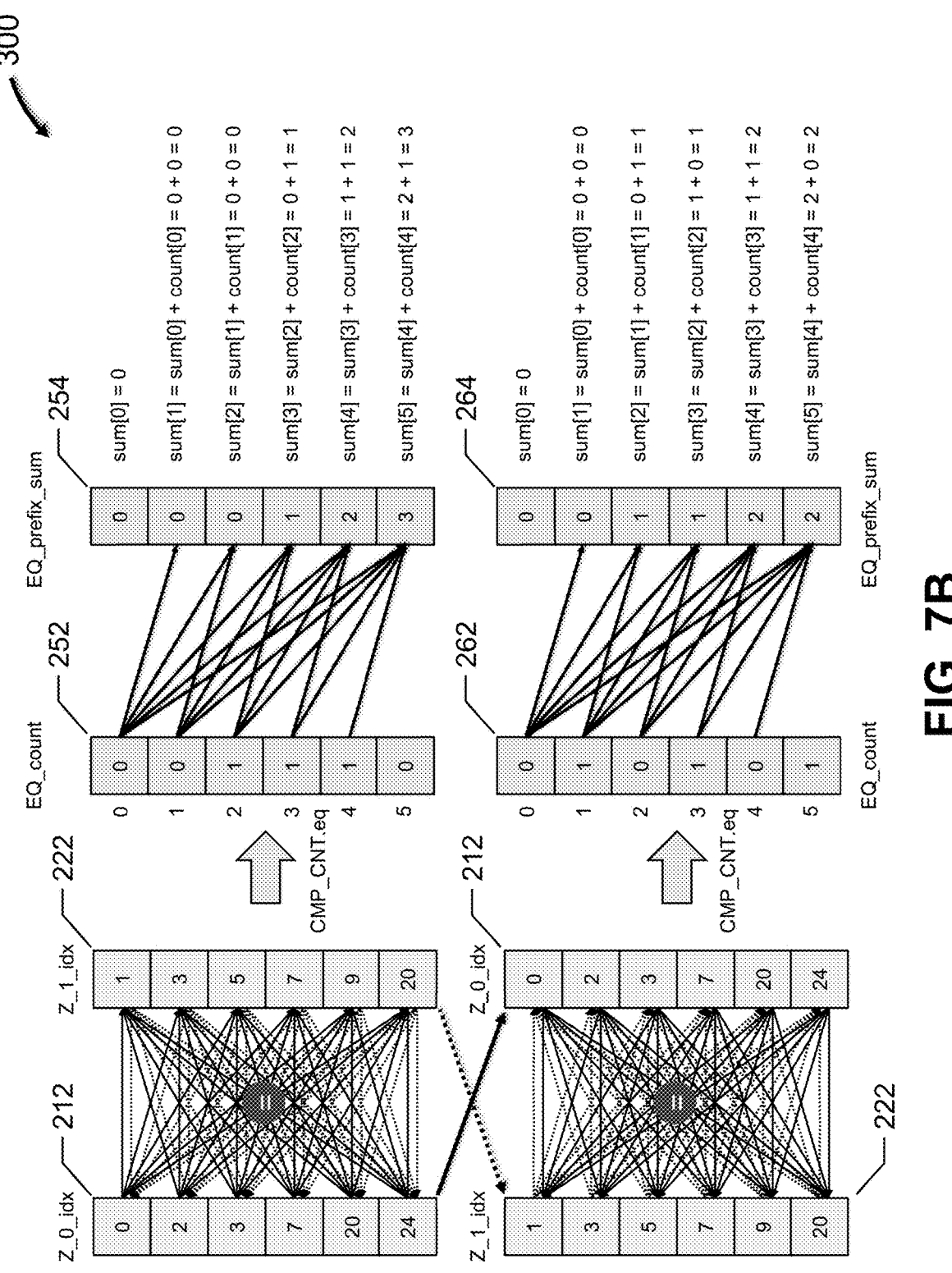

FIGS. 7A and 7B depict merge operation 300 of two vectors of sorted indices, according to an embodiment of the present disclosure.

In this embodiment, merge operation 300 uses processor instructions to perform vector comparison and counting operations on index vectors 212 and 222 to generate the intermediate vectors GT_count vector 250, EQ_count vector

252, GT_count vector 261, and EQ_count vector 262. In this embodiment, while GT_count vector 261 replaces LT_count vector 260 due to the order of the input data, the results are the same.

In one embodiment, the "greater than" vector comparison and counting operation is a processor instruction that may be generally described by the following pseudocode (other implementations are also contemplated):

```
CMP_CNT.gt              // Count 'greater than' results
                        // Z_0_idx (index vector 212), Z_1_idx (index
                        vector 222)
                        // Output: Z_out
Z_0_idx [ VL ];         // Input 0
Z_1_idx [ VL ];         // Input 1
Z_out[ VL ] = VL'0;     // start with zero'd output vector, VL = vector
                        length
For each op0_elem in Z_0_idx:
    For each op1_elem in Z_1_idx:
        If ( Z_0_idx [ op0_elem ] > Z_1_idx [ op1_elem ] ):
                    Z_out[ op0_elem ] += 1;
```

In one embodiment, the "equal to" vector comparison and counting operation is a processor instruction that may be generally described by the following pseudocode (other implementations are also contemplated):

```
CMP_CNT.eq              // Count 'equal to' results
                        // Z_0_idx (index vector 212), Z_1_idx (index
                        vector 222)
                        // Output: Z_out
Z_0_idx[ VL ];          // Input 0
Z_1_idx[ VL ];          // Input 1
Z_out[ VL ] = VL'0;     // start with zero'd output vector, VL = vector
                        length
For each op0_elem in Z_0_idx:
    For each op1_elem in Z_1_idx:
        If ( Z_0_idx[ op0_elem ] == Z_1_idx[ op1_elem ] ):
                    Z_out[ op0_elem ] += 1;
```

To generate GT_count vector 250 using processor instruction CMP_CNT.gt, index vector 212 is provided as input 0 and index vector 222 is provided as input 1. Similarly, to generate EQ_count vector 252 using processor instruction CMP_CNT.eq, index vector 212 is provided as input 0 and index vector 222 is provided as input 1. EQ_prefix_sum vector 254 is calculated as described above, e.g., a simple loop, dedicated instruction, etc.

To generate GT_count vector 261 using processor instruction CMP_CNT.gt, index vector 222 is provided as input 0 and index vector 212 is provided as input 1. Similarly, to generate EQ_count vector 262 using processor instruction CMP_CNT.eq, index vector 222 is provided as input 0 and index vector 212 is provided as input 1. EQ_prefix_sum vector 264 is calculated as described above, e.g., a simple loop, dedicated instruction, etc.

Merge operation 300 generates scatter index vector 256 for vector 210 and scatter index vector 266 for vector 220 based on the respective intermediate vectors and baseline index vector 270. Merge operation 200 then executes a scatter operation, using scatter index vectors 256 and 266, on index vectors 212 and 222 (or data vectors 214 and 224), respectively, to generate sorted merged vector 290 of indices (or data, as discussed above). The intermediate vectors, baseline index vector 270, scatter index vectors 256 and 266 and sorted merged vector 290 may be stored in vector registers, memory, etc.

Figure 7C:
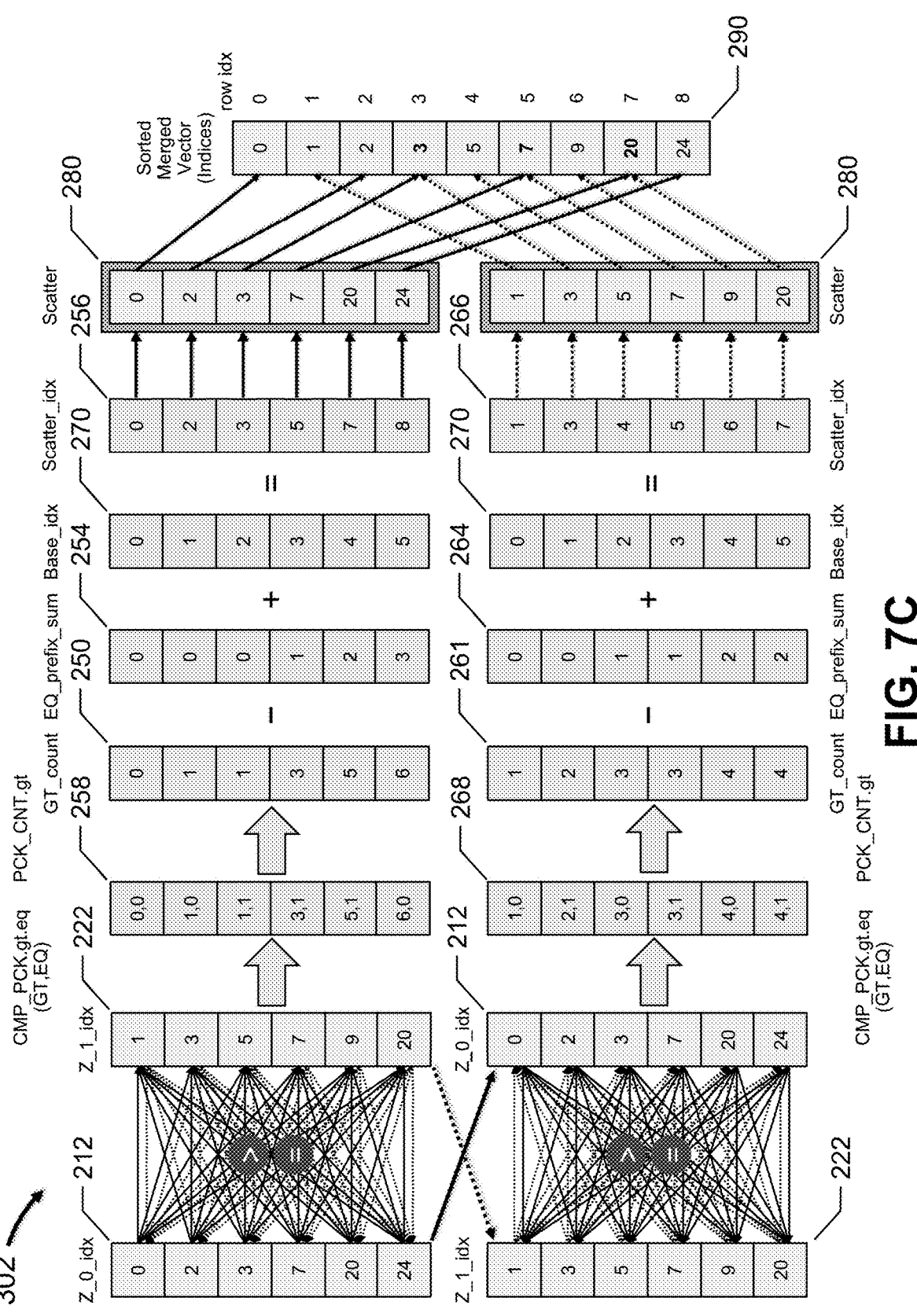
FIGS. 7C and 7D depict a merge operation of two vectors of sorted indices, according to an embodiment of the present disclosure.
Figure 7D:
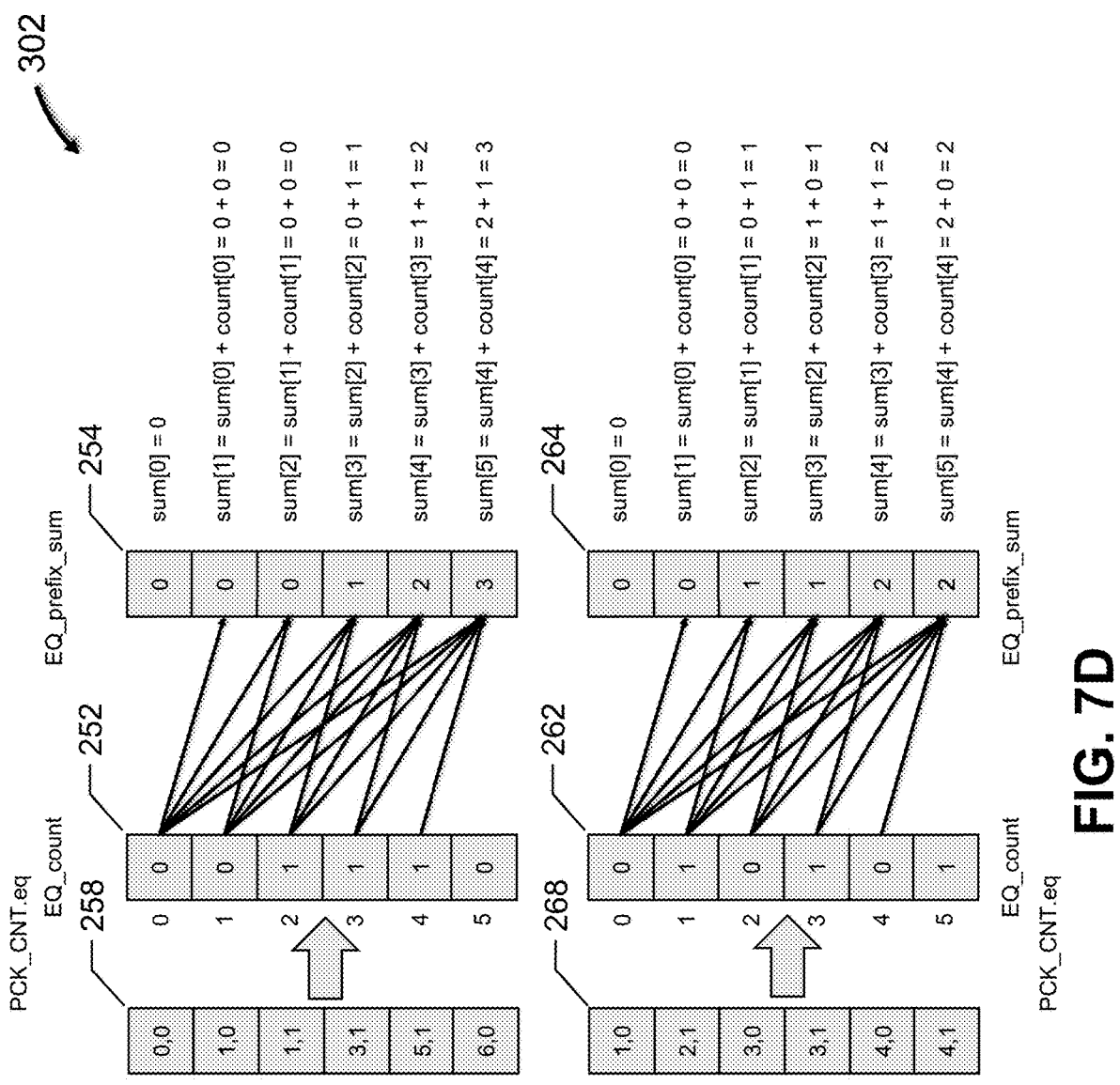

FIGS. 7C and 7D depict merge operation 302 of two vectors of sorted indices, according to an embodiment of the present disclosure.

In this embodiment, merge operation 302 uses processor instructions to perform vector comparison and counting operations on index vectors 212 and 222 to generate count vectors 258 and 268, from which the intermediate vectors GT_count vector 250, EQ_count vector 252, GT_count vector 261, and EQ_count vector 262 are generated. Additional processor instructions are used to unpack count vectors 258 and 268. In this embodiment, while GT_count vector 261 replaces LT_count vector 260 due to the order of the input data, the results are the same.

Count vectors 258 and 268 store two values in each element, the first value represents "greater than" or ">" count of the comparison Z_0_idx[i]>Z_1_idx[j](or Z_1_idx[i]>Z_0_idx[j]), and the second value represents the "equal to" or count of the comparison Z_0_idx[i]=Z_1_idx[j] or (Z_1_idx[i]=Z_0_idx[j]).

In one embodiment, the "greater than" and "equal to" vector comparison and counting operations are combined into a single processor instruction that may be generally described by the following pseudocode (other implementations are also contemplated):

```
CMP_PCK.gt.eq           // Count 'greater than' and 'equal to' results
                        // Packs 2 result counts into output vector
                        // This example uses 16-bit input data-types for comparison
                        // Z_0_idx (index vector 212), Z_1_idx (index vector 222)
                        // Output vector Z_out packs 2 counts for each input element
                        // Z_out (count vector 258 or data vector 269)
In_size = VL / 16;      // number of 16-bit operands in vector
Z_0_idx[ VL ];          // Input 0 (or input 1)
Z_1_idx[ VL ];          // Input 1 (or input 0)
Out_size = VL / 8       // Pack 8-bit counters for output vector
Z_out[ Out_size ] = Out_size'0;   // Output zero'd
For each op0_idx from ( 0 to In_size ):
    For each op1_elem from ( 0 to In_size ):
        If ( Z_0_idx[ op0_idx ] > Z_1_idx [ op1_idx ] ):
                    Z_out[ 2*op0_idx ] += 1;   // Pack gt result in even locations
        If ( Z_0_idx[ op0_idx ] == Z_1_idx [ op1_idx ] ):
                    Z_out[ 2*op0_idx+1 ] += 1; // Pack eq result in odd locations
```

In one embodiment, the "greater than" elements of count vectors 258 and 268 are unpacked using a single processor instruction that may be generally described by the following pseudocode (other implementations are also contemplated):

```
PCK_CNT.gt              // Extract 'greater than' counts from packed count vector
                        // Example using 16-bit comparison ops, 8-bit counts
                        // Inputs: Z_pckd (count vector 258 or 268)
                        // Outputs: Z_out (GT_count vector 250 or 261)
In_size = VL / 8;
Z_pckd[ In_size ];         // packed count input
Out_size = VL / 16;
Z_out[ Out_size ] = Out_size'0;   // Output zero'd
For idx from ( 0 to Out_size ):
   Z_out[ idx ] = Z_pckd[ 2*idx ];   // Only extracting even counts (gt) incl. 0
```

In one embodiment, the "equal to" elements of count vectors 258 and 268 are unpacked using a single processor instruction that may be generally described by the following pseudocode (other implementations are also contemplated):

```
PCK_CNT.eq              // Extract 'equal to' counts from packed count vector
                        // Example using 16-bit comparison ops, 8-bit counts
                        // Inputs: Z_pckd (count vector 258 or 268)
                        // Outputs: Z_out (EQ_count vector 252 or 262)
In_size = VL / 8;
Z_pckd[ In_size ];         // packed count input
Out_size = VL / 16;
Z_out[ Out_size ] = Out_size'0;   //Output zero'd
For idx from ( 0 to Out_size ):
   Z_out[ idx ] = Z_pckd[ 2*idx + 1 ];     // Only extracting even counts (gt)
```

To generate count vector 258 using processor instruction CMP_PCK.gt.eq, index vector 212 is provided as input 0 and index vector 222 is provided as input 1. To generate GT_count vector 252 using processor instruction PCK_CNT.gt, count vector 258 is provided as input. To generate EQ_count vector 252 using processor instruction PCK_CNT.eq, count vector 258 is provided as input, and EQ_prefix_sum vector 254 is calculated as described above, e.g., a simple loop, dedicated instruction, etc.

To generate count vector 268 using processor instruction CMP_PCK.gt.eq, index vector 222 is provided as input 0 and index vector 212 is provided as input 1. To generate GT_count vector 261 using processor instruction PCK_CNT.gt, count vector 268 is provided as input. To generate EQ_count vector 262 using processor instruction PCK_CNT.eq, count vector 268 is provided as input, and EQ_prefix_sum vector 264 is calculated as described above, e.g., a simple loop, dedicated instruction, etc.

Merge operation 302 generates scatter index vector 256 for vector 210 and scatter index vector 266 for vector 220 based on the respective intermediate vectors and baseline index vector 270. Merge operation 200 then executes a scatter operation, using scatter index vectors 256 and 266, on index vectors 212 and 222 (or data vectors 214 and 224), respectively, to generate sorted merged vector 290 of indices (or data, as discussed above). The intermediate vectors, baseline index vector 270, scatter index vectors 256 and 266 and sorted merged vector 290 may be stored in vector registers, memory, etc.

In another embodiment, the merge operation uses processor instructions to perform vector comparison and counting operations on index vectors 212 and 222 to generate count vectors 258 and 268, from which the intermediate vectors GT_count vector 250, EQ_count vector 252, GT_count vector 261, and EQ_count vector 262 are generated. In this embodiment, the "greater than," "less than" and "equal to" vector comparison and counting operations are combined into a single processor instruction.

Count vectors 258 and 268 store three values in each element, the first value represents "greater than" or ">" count of the comparison $Z\_0\_idx[i]>Z\_1\_idx[j]$(or $Z\_1\_idx[i]>Z\_0\_idx[j]$), the second value represents the "equal to" or "=" count of the comparison $Z\_0\_idx[i]=Z\_1\_idx[j]$ or $(Z\_1\_idx[i]=Z\_0\_idx[j])$, and the third value represents the "less than" or "<" count of the comparison $Z\_0\_idx[i]<Z\_1\_idx[j]$(or $Z\_1\_idx[i]<Z\_0\_idx[j]$).

Additional processor instructions are used to unpack count vectors 258 and 268 to recover the "greater than," "equal to" and "less than" elements of count vectors 258. For example, these elements may be unpacked using a single processor instruction, individual processor instructions, etc., as described above. In this embodiment, while GT_count vector 261 replaces LT_count vector 260 due to the order of the input data, the results are the same.

Figure 8:
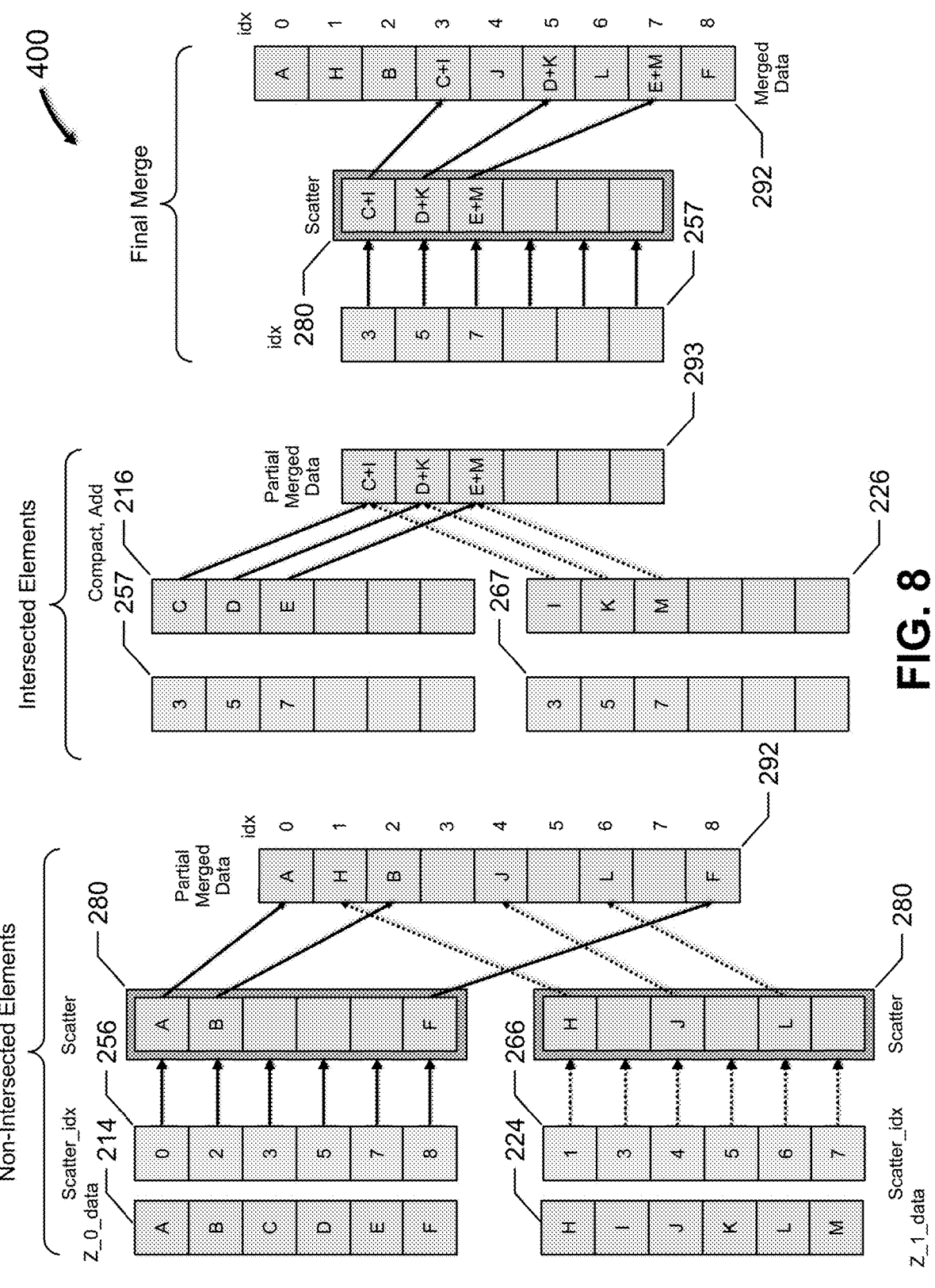
FIG. 8 depicts a scatter operation of two vectors of sorted indices and data, according to an embodiment of the present disclosure.

FIG. 8 depicts scatter operation 400 of two vectors of sorted indices and data, according to an embodiment of the present disclosure.

Generally, scatter operation 400 performs scatter, compact, add and scatter operations to generate sorted merged vector 292. The non-intersected and intersected elements of scatter index vectors 256, 266 and data vectors 214, 224 are identified, and the non-intersected elements of data vectors 214, 224 are scattered into sorted merged vector 292 using the non-intersected elements of scatter index vectors 256, 266, respectively. Sorted merged vector 292 now includes partially-merged data.

The intersected elements of scatter index vectors 256, 266 are compacted into compacted scatter index vectors 257, 267, respectively. The intersected data elements of data vectors 214, 224 are compacted into compacted data vectors 216, 226, respectively, added (or accumulated) into partial merged vector 293, which is then scattered into sorted merged vector 292 using compacted scatter index vector 257.

Figure 9:
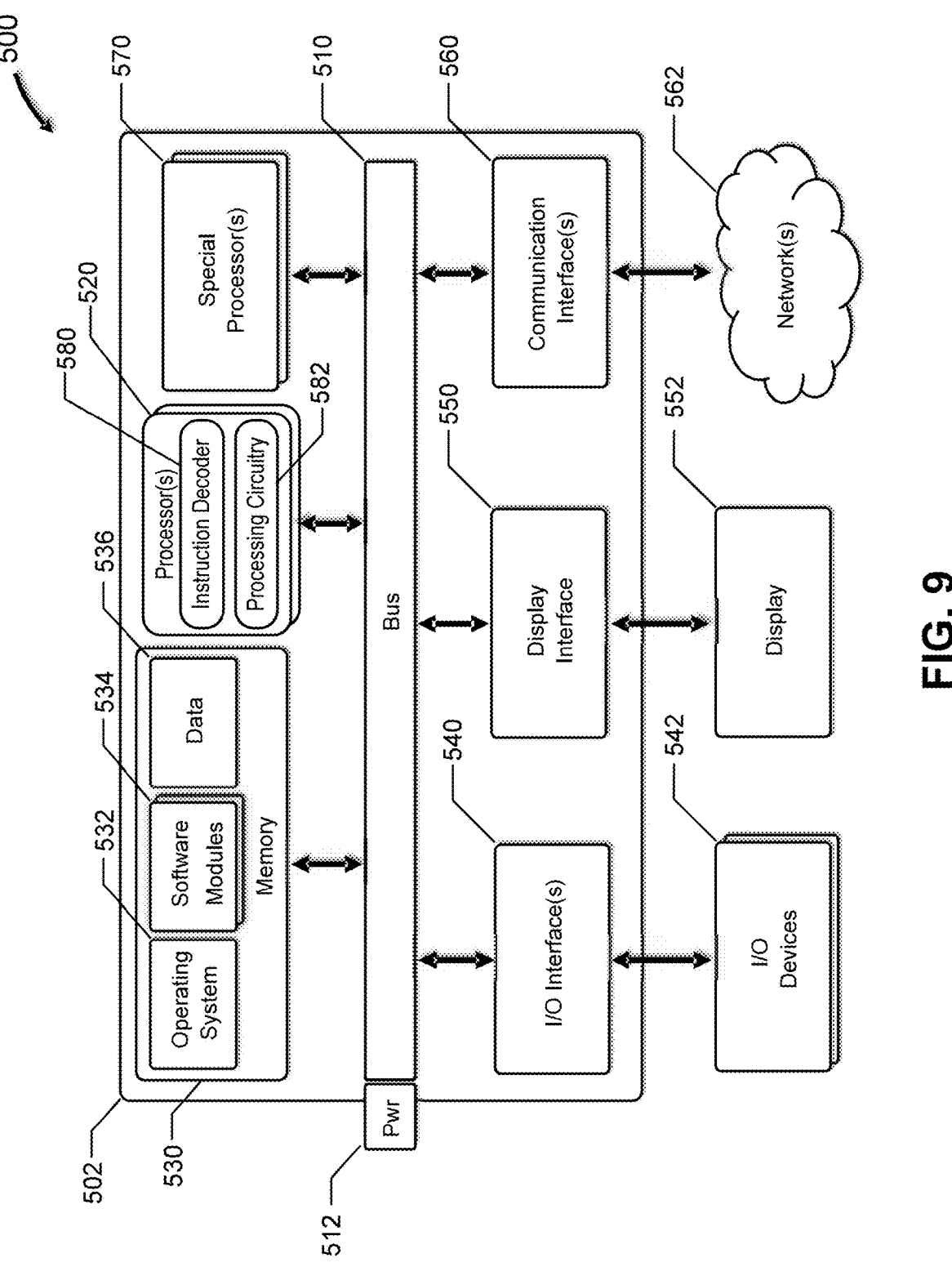
FIG. 9 depicts a block diagram of a system, in accordance with an embodiment of the present disclosure.

FIG. 9 depicts a block diagram of system 500, in accordance with an embodiment of the present disclosure.

Computer 502 includes bus 510 coupled to one or more processors 520, memory 530, I/O interfaces 540, display interface 550, one or more communication interfaces 560 and one or more special processors 570. Generally, I/O interfaces 540 are coupled to I/O devices 542 using a wired or wireless connection, display interface 550 is coupled to display 552, and communication interface 560 is connected to network 562 using a wired or wireless connection.

Bus 510 is a communication system that transfers data between processor 520, memory 530, I/O interfaces 540, display interface 550, communication interface 560, special processor 570, as well as other components (not depicted). Power connector 512 is coupled to bus 510 and a power supply (not shown).

Processor 520 includes one or more general-purpose or application-specific microprocessors that executes instructions to perform control, computation, input/output, etc. functions for computer 502. Processor 520 may include a single integrated circuit, such as a micro-processing device, multiple cores, multiple integrated circuit devices and/or circuit boards working in cooperation, etc., to accomplish the functions of processor 520. In addition, processor 520 may execute computer programs or modules, such as operating system 532, software modules 534, etc., stored within memory 530. For example, software modules 534 may include an ML application, an ANN application, a CNN application, etc. Generally, processor 520 includes one or more instruction decoders; in many embodiments, processor 520 includes an instruction decoder 580 configured to control processing circuitry 582 to perform the scatter accumulate instruction.

Generally, storage element or memory 530 stores instructions for execution by processor 520 and data. Memory 530 may include a variety of non-transitory computer-readable medium that may be accessed by processor 520. In various embodiments, memory 530 may include volatile and non-volatile medium, non-removable medium and/or removable medium. For example, memory 530 may include any combination of random access memory (RAM), dynamic RAM (DRAM), static RAM (SRAM), read only memory (ROM), flash memory, cache memory, and/or any other type of non-transitory computer-readable medium.

Memory 530 contains various components for retrieving, presenting, modifying, and storing data. For example, memory 530 stores software modules that provide functionality when executed by processor 520. The software modules include operating system 532 that provides operating system functionality for computer 502. Software modules 534 provide various functionality, such as image classification using convolutional neural networks, etc. Data 536 may include data associated with operating system 532, software modules 534, etc.

I/O interfaces 540 are configured to transmit and/or receive data from I/O devices 542. I/O interfaces 540 enable connectivity between processor 520 and I/O devices 542 by encoding data to be sent from processor 520 to I/O devices 542, and decoding data received from I/O devices 542 for processor 520. Generally, data may be sent over wired and/or wireless connections. For example, I/O interfaces 540 may include one or more wired communications interfaces, such as USB, Ethernet, etc., and/or one or more wireless communications interfaces, coupled to one or more antennas, such as WiFi, Bluetooth, cellular, etc.

Generally, I/O devices 542 provide input to computer 502 and/or output from computer 502. As discussed above, I/O devices 542 are operably connected to computer 502 using a wired and/or wireless connection. I/O devices 542 may include a local processor coupled to a communication interface that is configured to communicate with computer 502 using the wired and/or wireless connection. For example, I/O devices 542 may include a keyboard, mouse, touch pad, joystick, etc.

Display interface 550 is configured to transmit image data from computer 502 to monitor or display 552.

Communication interface 560 is configured to transmit data to and from network 562 using one or more wired and/or wireless connections. Network 562 may include one or more local area networks, wide area networks, the Internet, etc., which may execute various network protocols, such as, for example, wired and/or wireless Ethernet, Bluetooth, etc. Network 562 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Special processor 570 is configured to perform the scatter add operation and to support various applications implemented by software modules 534.

The embodiments described herein are combinable.

In one embodiment, a processor includes an instruction decoder configured to decode instructions, and processing circuitry configured to perform data processing in response to instructions decoded by the instruction decoder. In response to one or more read instructions, the instruction decoder is configured to control the processing circuitry to read first and second vectors from a storage, each vector including at least index values. In response to a sequence of instructions, the instruction decoder is configured to control the processing circuitry to generate scatter index values for the first and second vectors based on the index values of the first and second vectors. And, in response to one or more scatter instructions, the instruction decoder is configured to execute a scatter operation, using the scatter index values of the first and second vectors, to generate a sorted merged vector.

In another embodiment of the processor, the sorted merged vector includes merged index values.

In another embodiment of the processor, each vector includes data values; each index value is associated with a data value; each scatter index value is associated with a data value; the scatter operation is a scatter add operation that uses the scatter index values and data values of the first and second vectors to generate the sorted merged vector; and the sorted merged vector includes merged data values.

In another embodiment of the processor, generate scatter index values includes generate baseline index values; for the first vector, in response to one or more comparison count instructions, generate greater than count values for the first vector, each greater than count value being associated with an index value of the first vector, and generate equal to count values for the first vector, each equal to count value being associated with an index value of the first vector; and, for the second vector, in response to one or more comparison count instructions, generate greater than count values for the second vector, each greater than count value being associated with an index value of the second vector, and generate equal to count values for the second vector, each equal to count value being associated with an index value of the second vector.

In another embodiment of the processor, said generate greater than count values for the first vector includes, for each index value of the first vector, determine a number of index values of the second vector that are less than the index value of the first vector, and generate a greater than count value equal to the number; said generate equal to count values for the first vector includes, for each index value of the first vector, determine a number of index values of the first vector that are equal to the index value of the second vector, and generate an equal to count value equal to the number; said generate greater than count values for the second vector includes, for each index value of the second vector, determine a number of index values of the first vector that are less than the index value of the second vector, and generate a greater than count value equal to the number; and said generate equal to count values for the second vector includes, for each index value of the second vector, determine a number of index values of the second vector that are equal to the index value of the first vector, and generate an equal to count value equal to the number.

In another embodiment of the processor, generate scatter index values includes, for the first vector, generate equal prefix sum values for the first vector based on the equal to count values for the first vector, each equal prefix sum value being associated with an index value of the first vector, subtract the equal prefix sum values from the greater than count values to generate difference values, and add the baseline index values to the difference values to generate the scatter index values for the first vector; and, for the second vector, generate equal prefix sum values for the second vector based on the equal to count values for the second vector, each equal prefix sum value being associated with an index value of the second vector, subtract the equal prefix sum values from the greater than count values to generate difference values, each scatter index value being associated with an index value of the second vector, and add the baseline index values to the difference values to generate the scatter index values for the second vector, each scatter index value being associated with an index value of the second vector.

In another embodiment of the processor, generate equal prefix sum values for the first vector includes, for a first index value of the first vector, generate an equal prefix sum value equal to 0; for each index value of the first vector subsequent to the first index value of the first vector, determine a partial sum of the equal count values from preceding index values; and generate an equal prefix sum value equal to the partial sum; said generate equal prefix sum values for the second vector includes, for a first index value of the second vector, generate an equal prefix sum value equal to 0; for each index value of the second vector subsequent to the first index value of the second vector, determine a partial sum of the equal count values from preceding index values; and generate an equal prefix sum value equal to the partial sum.

In another embodiment, a processor-based method includes reading first and second vectors from a storage, each vector including at least index values, generating scatter index values for the first and second vectors based on the index values of the first and second vectors; and executing a scatter operation, using the scatter index values of the first and second vectors, to generate a sorted merged vector.

In another embodiment of the processor-based method, the sorted merged vector includes merged index values.

In another embodiment of the processor-based method, each vector includes data values; each index value is associated with a data value; each scatter index value is associated with a data value; the scatter operation is a scatter add operation that uses the scatter index values and data values of the first and second vectors to generate the sorted merged vector; and the sorted merged vector includes merged data values.

In another embodiment of the processor-based method, generating scatter index values includes generating baseline index values; and, for the first vector, generating greater than count values for the first vector, each greater than count value being associated with an index value of the first vector, generating equal prefix sum values for the first vector, each equal prefix sum value being associated with an index value of the first vector, subtracting the equal prefix sum values from the greater than count values to generate difference values, and adding the baseline index values to the difference values to generate the scatter index values for the first vector, where each scatter index value is associated with a data value of the first vector.

In another embodiment of the processor-based method, generating greater than count values for the first vector includes, for each index value of the first vector, determine a number of index values of the second vector that are less than the index value of the first vector; and generating a greater than count value equal to the number.

In another embodiment of the processor-based method, generating equal prefix sum values for the first vector includes, for each index value of the first vector, determining a number of index values of the second vector that are equal to the index value of the first vector; generating an equal count value equal to the number; for a first index value of the first vector, generating an equal prefix sum value equal to 0; for each index value of the first vector subsequent to the first index value of the first vector, determining a partial sum of the equal count values from preceding index values; and generating an equal prefix sum value equal to the partial sum.

In another embodiment of the processor-based method, generating scatter index values includes for the second vector, generating greater than count values for the second vector, each greater than count value being associated with an index value of the second vector; generating equal prefix sum values for the second vector, each equal prefix sum value being associated with an index value of the second vector; subtracting the equal prefix sum values from the greater than count values to generate difference values; and adding the baseline index values to the difference values to generate the scatter index values for the second vector, where each scatter index value is associated with a data value of the second vector.

In another embodiment of the processor-based method, generating less than count values for the second vector includes for each index value of the second vector, determining a number of index values of the first vector that are less than the index value of the second vector; and generating a less than count value equal to the number.

In another embodiment of the processor-based method, generating equal prefix sum values for the second vector includes, for each index value of the second vector, determining a number of index values of the first vector that are equal to the index value of the second vector; generating an equal count value equal to the number; for a first index value of the second vector, generating an equal prefix sum value equal to 0; for each index value of the second vector subsequent to the first index value of the second vector, determining a partial sum of the equal count values from preceding index values; and generating an equal prefix sum value equal to the partial sum.

In another embodiment, a processor is configured to read first and second vectors from a storage, each vector including at least index values; generate scatter index values for the first and second vectors based on the index values of the first and second vectors; and execute a scatter operation, using the scatter index values of the first and second vectors, to generate a sorted merged vector.

In another embodiment of the processor, the sorted merged vector includes merged index values.

In another embodiment of the processor, each vector includes data values; each index value is associated with a data value; each scatter index value is associated with a data value; the scatter operation is a scatter add operation that uses the scatter index values and data values of the first and second vectors to generate the sorted merged vector; and the sorted merged vector includes merged data values.

In another embodiment of the processor, generate scatter index values includes generate baseline index values; for the first vector, generate greater than count values for the first vector, each greater than count value being associated with an index value of the first vector, and generate equal to count values for the first vector, each equal to count value being associated with an index value of the first vector; for the second vector, generate greater than count values for the second vector, each greater than count value being associated with an index value of the second vector, and generate equal to count values for the second vector, each equal to count value being associated with an index value of the second vector; and generate the scatter index values for the first and second vectors based on the baseline index values, the greater than count values for the first and second vectors, and the equal to count values for the first and second vectors.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A processor, comprising:
an instruction decoder configured to decode instructions; and
processing circuitry configured to perform data processing in response to instructions decoded by the instruction decoder,
where, in response to one or more read instructions, the instruction decoder is configured to control the processing circuitry to read first and second vectors from a storage, each vector including at least index values, where, in response to a sequence of instructions, the instruction decoder is configured to control the processing circuitry to generate scatter index values for the first and second vectors based on the index values of the first and second vectors, and where, in response to one or more scatter instructions, the instruction decoder is configured to execute a scatter operation, using the scatter index values of the first and second vectors, to generate a sorted merged vector, where said generate scatter index values includes:

generate baseline index values;

for the first vector, in response to one or more comparison count instructions:

generate greater than count values for the first vector, each greater than count value being associated with an index value of the first vector, and generate equal to count values for the first vector, each equal to count value being associated with an index value of the first vector; and for the second vector, in response to one or more comparison count instructions:

generate greater than count values for the second vector, each greater than count value being associated with an index value of the second vector, and generate equal to count values for the second vector, each equal to count value being associated with an index value of the second vector.

2. The processor according to claim 1, where the sorted merged vector includes merged index values.

3. The processor according to claim 1, where:

each vector includes data values;

each index value is associated with a data value;

each scatter index value is associated with a data value;

the scatter operation is a scatter add operation that uses the scatter index values and data values of the first and second vectors to generate the sorted merged vector; and the sorted merged vector includes merged data values.

4. The processor according to claim 1, where:

said generate greater than count values for the first vector includes:

for each index value of the first vector:

determine a number of index values of the second vector that are less than the index value of the first vector, and generate a greater than count value equal to the number;

said generate equal to count values for the first vector includes:

for each index value of the first vector:

determine a number of index values of the first vector that are equal to the index value of the second vector, and generate an equal to count value equal to the number;

said generate greater than count values for the second vector includes:

for each index value of the second vector:

determine a number of index values of the first vector that are less than the index value of the second vector, and generate a greater than count value equal to the number; and said generate equal to count values for the second vector includes:

for each index value of the second vector:

determine a number of index values of the second vector that are equal to the index value of the first vector, and generate an equal to count value equal to the number.

5. The processor according to claim 4, where said generate scatter index values includes:

for the first vector:

generate equal prefix sum values for the first vector based on the equal to count values for the first vector, each equal prefix sum value being associated with an index value of the first vector, subtract the equal prefix sum values from the greater than count values to generate difference values, and add the baseline index values to the difference values to generate the scatter index values for the first vector; and for the second vector:

generate equal prefix sum values for the second vector based on the equal to count values for the second vector, each equal prefix sum value being associated with an index value of the second vector, subtract the equal prefix sum values from the greater than count values to generate difference values, each scatter index value being associated with an index value of the second vector, and add the baseline index values to the difference values to generate the scatter index values for the second vector, each scatter index value being associated with an index value of the second vector.

6. The processor according to claim 5, where:

said generate equal prefix sum values for the first vector includes:

for a first index value of the first vector:

generate an equal prefix sum value equal to 0;

for each index value of the first vector subsequent to the first index value of the first vector:

determine a partial sum of the equal count values from preceding index values; and generate an equal prefix sum value equal to the partial sum;

said generate equal prefix sum values for the second vector includes:

for a first index value of the second vector:

generate an equal prefix sum value equal to 0;

for each index value of the second vector subsequent to the first index value of the second vector:

determine a partial sum of the equal count values from preceding index values; and generate an equal prefix sum value equal to the partial sum.

7. A processor-based method, comprising:

reading first and second vectors from a storage, each vector including at least index values;

generating scatter index values for the first and second vectors based on the index values of the first and second vectors; and executing a scatter operation, using the scatter index values of the first and second vectors, to generate a sorted merged vector, where said generating scatter index values includes:

generating baseline index values; and for the first vector:

generating greater than count values for the first vector, each greater than count value being associated with an index value of the first vector, generating equal prefix sum values for the first vector, each equal prefix sum value being associated with an index value of the first vector, subtracting the equal prefix sum values from the greater than count values to generate difference values, and adding the baseline index values to the difference values to generate the scatter index values for the first vector, where each scatter index value is associated with a data value of the first vector.

8. The processor-based method according to claim 7, where the sorted merged vector includes merged index values.

9. The processor-based method according to claim 7, where:

each vector includes data values;

each index value is associated with a data value;

each scatter index value is associated with a data value;

the scatter operation is a scatter add operation that uses the scatter index values and data values of the first and second vectors to generate the sorted merged vector; and the sorted merged vector includes merged data values.

10. The processor-based method according to claim 7, where said generating greater than count values for the first vector includes:

for each index value of the first vector:

determine a number of index values of the second vector that are less than the index value of the first vector; and generating a greater than count value equal to the number.

11. The processor-based method according to claim 10, where said generating equal prefix sum values for the first vector includes:

for each index value of the first vector:

determining a number of index values of the second vector that are equal to the index value of the first vector;

generating an equal count value equal to the number;

for a first index value of the first vector:

generating an equal prefix sum value equal to 0;

for each index value of the first vector subsequent to the first index value of the first vector:

determining a partial sum of the equal count values from preceding index values; and generating an equal prefix sum value equal to the partial sum.

12. The processor-based method according to claim 11, where said generating scatter index values includes:

for the second vector:

generating greater than count values for the second vector, each greater than count value being associated with an index value of the second vector;

generating equal prefix sum values for the second vector, each equal prefix sum value being associated with an index value of the second vector;

subtracting the equal prefix sum values from the greater than count values to generate difference values; and adding the baseline index values to the difference values to generate the scatter index values for the second vector, where each scatter index value is associated with a data value of the second vector.

13. The processor-based method according to claim 12, where said generating less than count values for the second vector includes:

for each index value of the second vector:

determining a number of index values of the first vector that are less than the index value of the second vector; and generating a less than count value equal to the number.

14. The processor-based method according to claim 13, where said generating equal prefix sum values for the second vector includes:

for each index value of the second vector:

determining a number of index values of the first vector that are equal to the index value of the second vector;

generating an equal count value equal to the number;

for a first index value of the second vector:

generating an equal prefix sum value equal to 0;

for each index value of the second vector subsequent to the first index value of the second vector:

determining a partial sum of the equal count values from preceding index values; and generating an equal prefix sum value equal to the partial sum.

15. A processor configured to:

read first and second vectors from a storage, each vector including at least index values;

generate scatter index values for the first and second vectors based on the index values of the first and second vectors; and execute a scatter operation, using the scatter index values of the first and second vectors, to generate a sorted merged vector, where said generate scatter index values includes:

generate baseline index values;

for the first vector:

generate greater than count values for the first vector, each greater than count value being associated with an index value of the first vector, and generate equal to count values for the first vector, each equal to count value being associated with an index value of the first vector;

for the second vector:

generate greater than count values for the second vector, each greater than count value being associated with an index value of the second vector, and generate equal to count values for the second vector, each equal to count value being associated with an index value of the second vector; and generate the scatter index values for the first and second vectors based on the baseline index values, the greater than count values for the first and second vectors, and the equal to count values for the first and second vectors.

16. The processor according to claim 15, where the sorted merged vector includes merged index values.

17. The processor according to claim 15, where:

each vector includes data values;

each index value is associated with a data value;

each scatter index value is associated with a data value;

the scatter operation is a scatter add operation that uses the scatter index values and data values of the first and second vectors to generate the sorted merged vector; and the sorted merged vector includes merged data values.

\* \* \* \* \*